United States Patent
Eagles et al.

(10) Patent No.: US 8,728,280 B2
(45) Date of Patent: *May 20, 2014

(54) INDUSTRIAL FABRIC INCLUDING SPIRALLY WOUND MATERIAL STRIPS WITH REINFORCEMENT

(75) Inventors: Dana Eagles, Appleton, WI (US); Robert Hansen, North Muskegon, MI (US); Jonas Karlsson, Falkenberg (SE)

(73) Assignee: Albany International Corp., Rochester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,966

(22) Filed: May 11, 2012

(65) Prior Publication Data

US 2013/0086781 A1    Apr. 11, 2013

Related U.S. Application Data

(63) Continuation-in-part of application No. 12/635,367, filed on Dec. 10, 2009, now Pat. No. 8,388,812.

(60) Provisional application No. 61/246,812, filed on Sep. 29, 2009, provisional application No. 61/246,801, filed on Sep. 29, 2009, provisional application No. 61/147,637, filed on Jan. 27, 2009, provisional application No. 61/121,998, filed on Dec. 12, 2008.

(51) Int. Cl.
*D21F 1/44* (2006.01)
*B31F 1/16* (2006.01)
*B29C 53/58* (2006.01)

(52) U.S. Cl.
USPC ............ 162/362; 162/110; 162/116; 156/169

(58) Field of Classification Search
CPC ............... D21F 1/10; D21F 3/02; D21F 7/08; D21F 7/10; D21F 7/12; D21F 1/0063; D21F 1/0081; B29C 53/56; B29C 53/58; B29C 53/78; D04H 3/07
USPC ........ 162/358.1, 358.2, 358.4, 900–904, 348, 162/306, 361, 362; 28/110, 142; 139/383 A, 139/383 AA, 425 A; 156/169, 173, 180, 181; 34/95
See application file for complete search history.

(56) References Cited

U.S. PATENT DOCUMENTS 2,862,251 A    12/1958    Kalwaites
3,121,660 A    2/1964    Hall, Jr
(Continued)

FOREIGN PATENT DOCUMENTS

DE    25 38 691 A    3/1977
DE    3444082 A    8/1986
(Continued)

OTHER PUBLICATIONS

International Search Report and Written Opinion prepared by European Patent Office acting as the International Searching Authority for related international application PCT/US2013/040364 mailed Jul. 25, 2013.

*Primary Examiner* — Eric Hug
(74) *Attorney, Agent, or Firm* — Frommer Lawrence & Haug LLP; Ronald R. Santucci

(57) ABSTRACT

An industrial fabric such as an endless belt or sleeve for use in the production of nonwovens, and a method of making thereof are disclosed. The industrial fabric is produced by spirally winding strips of polymeric material, such as an industrial strapping or ribbon material, and joining the adjoining sides of the strips of material using ultrasonic welding or laser welding techniques. The fabric may then be perforated using a suitable technique to make it permeable to air and/or water.

34 Claims, 16 Drawing Sheets

(56) References Cited

U.S. PATENT DOCUMENTS

| | | |
|---|---|---|
| 3,214,819 A | 11/1965 | Guerin |
| 3,323,226 A | 6/1967 | Beaumont et al. |
| 3,399,111 A | 8/1968 | Beaumont et al. |
| 3,485,706 A | 12/1969 | Evans |
| 3,508,308 A | 4/1970 | Bunting, Jr. et al. |
| 4,085,485 A | 4/1978 | Brandon et al. |
| 4,206,258 A | 6/1980 | Balcar |
| 4,446,187 A | 5/1984 | Eklund |
| 4,495,680 A | 1/1985 | Beck |
| 4,537,658 A | 8/1985 | Albert |
| 4,541,895 A | 9/1985 | Albert |
| 4,842,905 A | 6/1989 | Stech |
| 4,849,054 A | 7/1989 | Klowak |
| 5,098,764 A | 3/1992 | Drelich et al. |
| 5,208,087 A * | 5/1993 | Stigberg ............... 428/60 |
| 5,244,711 A | 9/1993 | Drelich et al. |
| 5,245,025 A | 9/1993 | Trokhan et al. |
| 5,281,461 A | 1/1994 | Greenway et al. |
| 5,298,124 A | 3/1994 | Eklund et al. |
| 5,336,373 A | 8/1994 | Scattolino et al. |
| 5,360,656 A | 11/1994 | Rexfelt et al. |
| 5,393,384 A | 2/1995 | Steiner et al. |
| 5,445,746 A | 8/1995 | Lee |
| 5,549,193 A | 8/1996 | Schlueter, Jr. et al. |
| 5,674,587 A | 10/1997 | James et al. |
| 5,679,222 A | 10/1997 | Rasch et al. |
| 5,713,399 A * | 2/1998 | Collette et al. ......... 139/383 AA |
| 5,718,022 A | 2/1998 | Vuillaume |
| 5,730,817 A | 3/1998 | Feygin et al. |
| 5,768,756 A | 6/1998 | Noelle |
| 5,776,307 A | 7/1998 | Ampulski et al. |
| 5,814,349 A | 9/1998 | Geus et al. |
| 5,827,597 A | 10/1998 | James et al. |
| 5,837,102 A | 11/1998 | Graf |
| 5,900,122 A | 5/1999 | Huston |
| 5,906,786 A | 5/1999 | James et al. |
| 5,916,462 A | 6/1999 | James et al. |
| 5,972,813 A | 10/1999 | Polat et al. |
| 6,010,598 A | 1/2000 | Boutilier et al. |
| 6,120,642 A | 9/2000 | Lindsay et al. |
| 6,124,015 A | 9/2000 | Baker et al. |
| 6,159,880 A | 12/2000 | Schiel |
| 6,171,447 B1 | 1/2001 | Trokhan |
| 6,274,042 B1 | 8/2001 | Beck |
| 6,290,818 B1 | 9/2001 | Romanski |
| 6,331,341 B1 | 12/2001 | Joyce |
| 6,340,413 B1 | 1/2002 | Nilsson et al. |
| 6,358,594 B1 | 3/2002 | Ampulski |
| 6,436,240 B1 | 8/2002 | Jeffrey |
| 6,461,474 B1 | 10/2002 | Lindsay et al. |
| 6,547,924 B2 | 4/2003 | Klerelid et al. |
| 6,610,173 B1 | 8/2003 | Lindsay et al. |
| 6,616,812 B2 | 9/2003 | Beck |
| 6,616,814 B2 | 9/2003 | Best |
| 6,630,223 B2 * | 10/2003 | Hansen ............... 428/131 |
| 6,660,362 B1 | 12/2003 | Lindsay et al. |
| 6,712,940 B2 | 3/2004 | Crook |
| 6,723,208 B1 | 4/2004 | Hansen |
| 6,743,339 B1 | 6/2004 | Nilsson et al. |
| 6,743,571 B1 | 6/2004 | Hill et al. |
| 6,780,282 B2 | 8/2004 | Scherb et al. |
| 6,865,784 B2 | 3/2005 | Noelle |
| 6,875,315 B2 | 4/2005 | Bakken et al. |
| 6,878,238 B2 | 4/2005 | Bakken et al. |
| 6,989,080 B2 | 1/2006 | Hansen |
| 6,998,017 B2 | 2/2006 | Lindsay et al. |
| 7,005,044 B2 | 2/2006 | Kramer et al. |
| 7,008,513 B2 | 3/2006 | Davenport et al. |
| 7,014,735 B2 | 3/2006 | Kramer et al. |
| 7,022,208 B2 | 4/2006 | Davenport et al. |
| 7,128,809 B2 | 10/2006 | Vinson et al. |
| 7,128,810 B2 | 10/2006 | Hansen |
| 7,141,142 B2 | 11/2006 | Burazin et al. |
| 7,144,479 B2 | 12/2006 | Davis et al. |
| 7,166,196 B1 | 1/2007 | Kramer et al. |
| 7,169,265 B1 | 1/2007 | Kramer et al. |
| 7,294,238 B2 | 11/2007 | Bakken et al. |
| 7,297,233 B2 | 11/2007 | Herman et al. |
| 7,410,554 B2 | 8/2008 | Davenport |
| 7,491,297 B2 | 2/2009 | Serr et al. |
| 7,494,571 B2 | 2/2009 | Takamura |
| 7,501,044 B2 | 3/2009 | Hikida et al. |
| 7,504,060 B2 | 3/2009 | Brock et al. |
| 7,524,403 B2 | 4/2009 | Fernandes et al. |
| 7,527,709 B2 | 5/2009 | Lippi Alves Fernandes et al. |
| 7,540,942 B2 | 6/2009 | Hikita |
| 7,550,061 B2 | 6/2009 | Walkenhaus et al. |
| 8,388,812 B2 * | 3/2013 | Eagles et al. ............. 162/362 |
| 8,394,239 B2 * | 3/2013 | Eagles et al. ............. 162/348 |
| 2003/0087575 A1 | 5/2003 | Carlson et al. |
| 2003/0145444 A1 | 8/2003 | Schmitz |
| 2004/0069432 A1 | 4/2004 | Hansen |
| 2004/0116031 A1 | 6/2004 | Brennan et al. |
| 2004/0118545 A1 | 6/2004 | Bakken et al. |
| 2004/0118546 A1 | 6/2004 | Bakken et al. |
| 2005/0167062 A1 | 8/2005 | Herman et al. |
| 2007/0134467 A1 | 6/2007 | Sayers |
| 2007/0167099 A1 | 7/2007 | Patel et al. |
| 2007/0246119 A1 | 10/2007 | Herman |
| 2007/0298213 A1 | 12/2007 | Noda et al. |

FOREIGN PATENT DOCUMENTS

| | | |
|---|---|---|
| DE | 19548747 A | 7/1997 |
| EP | 0 037 387 | 10/1981 |
| EP | 0 147 904 | 7/1985 |
| EP | 0 337 451 | 10/1989 |
| EP | 0 446 432 A1 | 9/1991 |
| EP | 0 705 933 A | 4/1996 |
| EP | 0 972 876 A2 | 1/2000 |
| EP | 1040223 B | 2/2003 |
| EP | 1339915 B | 7/2007 |
| FR | 1460513 | 10/1966 |
| FR | 2730246 | 8/1996 |
| FR | 2734285 | 11/1996 |
| GB | 995620 | 6/1965 |
| GB | 1025000 | 4/1966 |
| GB | 1037003 | 7/1966 |
| GB | 1 393 426 | 5/1975 |
| GB | 1 515 455 | 6/1978 |
| JP | 61-020686 | 1/1986 |
| JP | 06-170959 | 6/1994 |
| JP | 2001-288671 A | 10/2001 |
| WO | WO 86/05219 A | 9/1986 |
| WO | WO 95/21285 A | 8/1995 |
| WO | WO 98/00605 A | 1/1998 |
| WO | WO 98/01618 A | 1/1998 |
| WO | WO 99/10597 A | 3/1999 |
| WO | WO 02/40769 A | 5/2002 |
| WO | WO 02/41815 A | 5/2002 |
| WO | WO 2004/038093 A | 5/2004 |
| WO | WO 2005/042836 A | 5/2005 |
| WO | WO 2005/087997 A | 9/2005 |
| WO | WO 2005/116332 A | 12/2005 |
| WO | WO 2008/006870 A | 1/2008 |
| WO | WO 2010/030298 A | 3/2010 |
| WO | WO-2010/030570 | 3/2010 |

* cited by examiner

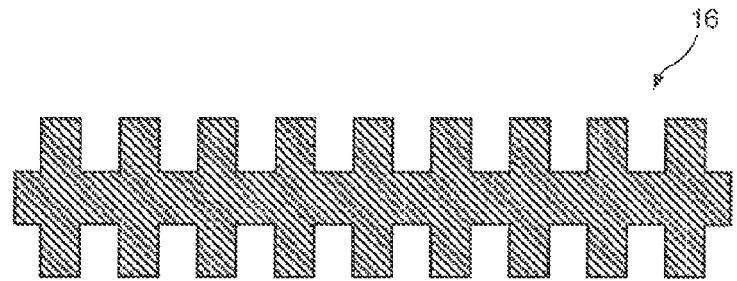
F I G. 5A
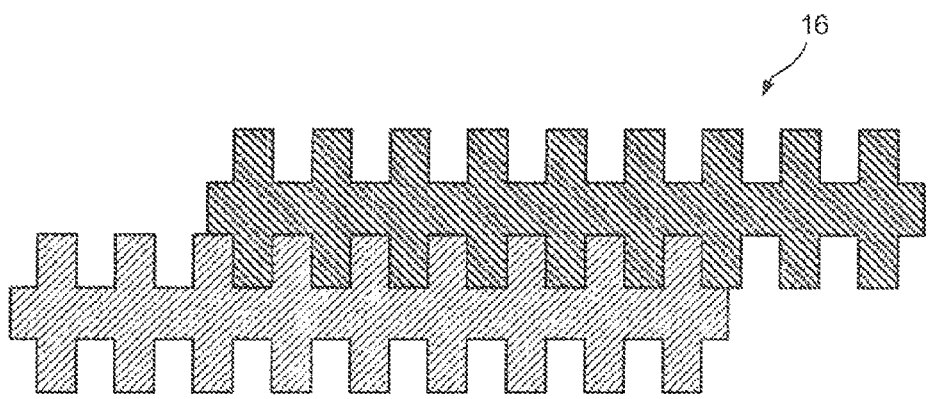
F I G. 5B
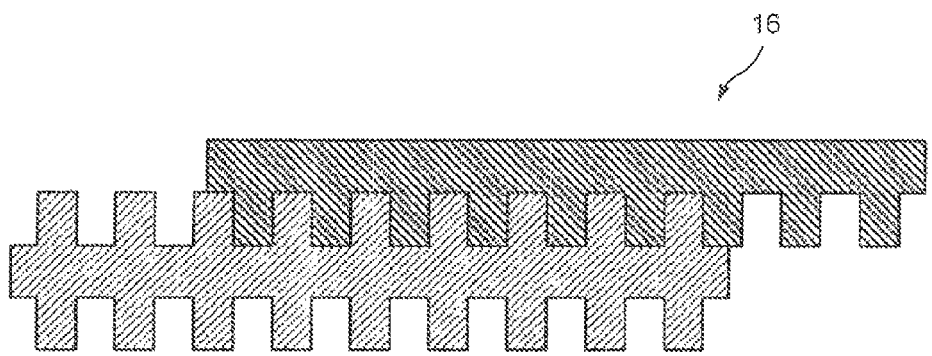
F I G. 5C

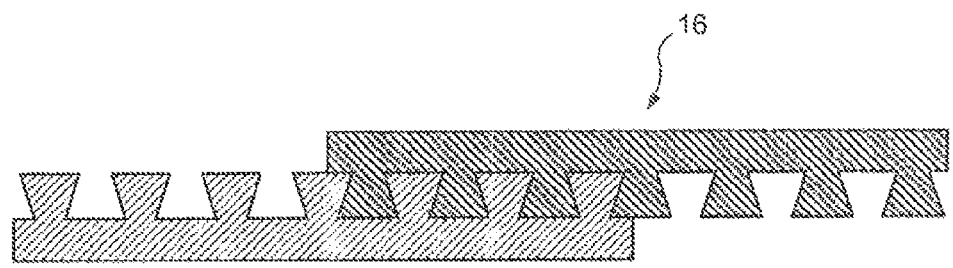
F I G. 8A
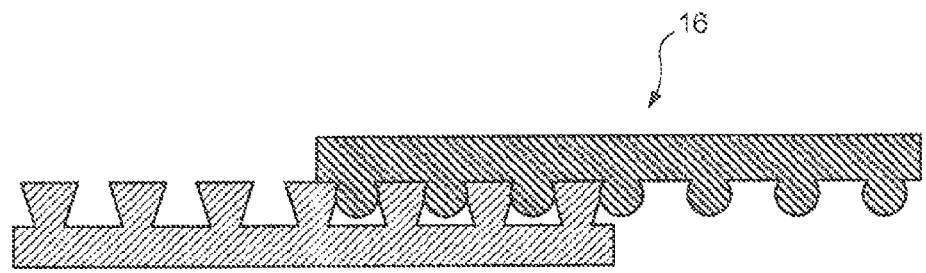
F I G. 8B
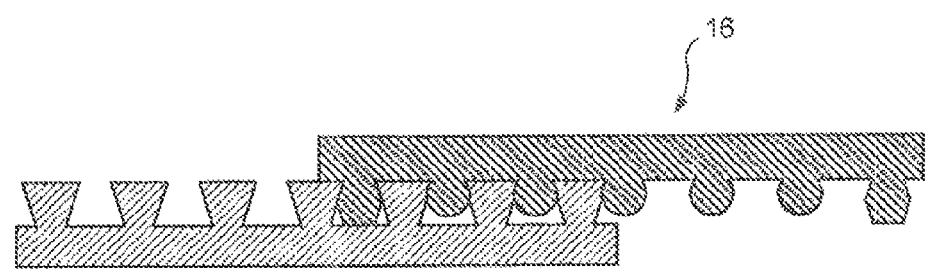
F I G. 8C

INDUSTRIAL FABRIC INCLUDING SPIRALLY WOUND MATERIAL STRIPS WITH REINFORCEMENT

CROSS-REFERENCE TO RELATED APPLICATIONS

This application is a Continuation-In-Part of U.S. patent application Ser. No. 12/635,367 filed Dec. 10, 2009, which claims priority of U.S. Provisional Patent Application No. 61/246,812 filed Sep. 29, 2009, U.S. Provisional Patent Application No. 61/246,801 filed Sep. 29, 2009, U.S. Provisional Patent Application No. 61/147,637 filed Jan. 27, 2009, and U.S. Provisional Patent Application No. 61/121,998 filed Dec. 12, 2008.

INCORPORATION BY REFERENCE

All patents, patent applications, documents, references, manufacturer's instructions, descriptions, product specifications, and product sheets for any products mentioned herein are incorporated by reference herein, and may be employed in the practice of the invention.

BACKGROUND OF THE INVENTION

1. Field of the Invention

The present invention is directed to endless fabrics, and particularly, industrial fabrics used in the production of nonwoven products. More particularly, the instant invention is directed to support members such as belts or sleeves used in the production of patterned or marked nonwoven products. Furthermore, the present invention may be used as a belt and/or sleeve used in the production of nonwovens by processes such as airlaid, melt blowing, spunbonding, and hydroentangling.

2. Description of the Prior Art

Processes for making nonwoven products have been known for many years. In one process, a fiber batt or web is treated with water streams or jets to cause the fibers to entangle with each other and improve the physical properties, such as strength, of the web. Such techniques for treatment by means of water jets have been known for decades, as may be gathered from the disclosures of U.S. Pat. Nos. 3,214,819, 3,508,308 and 3,485,706.

In general terms, this method involves interlacing of elementary fibers with one another by means of the action of water jets under pressure, which act on the fibrous structure like needles and make it possible to reorient part of the fibers forming the web in the thickness direction.

Such technology has been widely developed at the present time and is used not only for producing what are known as "spunlaced" or "hydroentangled" structures for textile use, such as, in particular for applications in medical fields and hospitals, for wiping, filtration and wrappings for teabags, and the articles obtained may be regular and homogeneous, as may be gathered from the disclosure of U.S. Pat. No. 3,508, 308, and if required, comprise designs resulting from the reorientation of the fibers, this being essential for an esthetic purpose, as may be gathered from the disclosure of U.S. Pat. No. 3,485,706.

As to products of the "spunlace" or "hydroentangled" type, it has been known for a very long time that the final properties of the product can be adapted by producing mixtures of material, for example by combining a plurality of webs consisting of fibers of different types, for example of natural, artificial or synthetic fibers, or even webs in which the fibers are previously mixed (webs of the "spunbond" type, etc.) with reinforcements that can be incorporated into the nonwoven structure.

French patents FR-A-2 730 246 and 2 734 285, corresponding respectively to U.S. Pat. Nos. 5,718,022 and 5,768, 756, describe solutions which make it possible to successfully treat hydrophobic fibers or mixtures of these fibers with other hydrophilic fibers or even webs consisting entirely of natural fibers by means of water jets.

In general terms, according to the teachings of these documents, the treatment involves treating a basic web composed of elementary fibers of the same type or of different types, compressing and moistening this basic web and then intermingling the fibers by means of at least one rack of contiguous jets of water under high pressure acting on the basic web.

For this purpose, the basic web is advanced positively on an endless porous support in motion, and it is brought onto the surface of a perforated rotary cylindrical drum, to the interior of which a partial vacuum is applied. The basic web is compressed mechanically between the porous support and the rotary drum which both advance substantially at the same speed. Immediately downstream of the compression zone, a water curtain is directed onto the web and passes successively through the porous support, the compressed basic web and the supporting perforated drum wherein a vacuum source removes the excess water.

The elementary fibers are intermingled continuously, still on the rotary cylindrical drum, by the compressed and wetted web being subjected to the action of at least one rack of jets of water under high pressure. In general, bonding is carried out by means of a plurality of successive racks of water jets which act either on the same face or alternately against the two faces of the web, the pressure within the racks and the velocity of the jets discharged varying from one rack to the next and usually progressively.

It is important to note, as may be gathered from FR 2 734 285, that the perforated roller/drum may comprise randomly distributed micro-perforations. If required, after the initial bonding treatment, the fibrous nonwoven structure may be subjected to a second treatment applied to the reverse face.

In the process of producing spunlaced or hydroentangled nonwoven products, it is often desired to impart a pattern or mark on the finished product, thereby creating a desired design on the product. This pattern or mark is typically developed using a secondary process, separate from the nonwoven sheet forming and roll-up process, where an embossed/patterned calendar roll is used. These rolls are typically expensive and operate on the principle of compressing certain areas of the fibrous web to create the required patterns or marks. However, there are several drawbacks of using a separate process for creating the pattern or mark on the nonwoven product. For example, a high initial investment for calendar rolls would be required, which can limit the length of production runs that can be economically justified by a producer. Second, higher processing costs would be incurred due to a separate patterning or marking stage. Third, the final product would have a higher than required material content to maintain product caliper (thickness) after compression in the calendaring step. Lastly, the two-stage process would lead to a lower bulk in the finished product than desired due to high pressure compression during calendaring. Prior art nonwoven products made with these known patterning processes do not have clear, well defined raised portions and therefore the desired patterns are difficult to see. In addition, the raised portions of prior art embossed nonwoven products are not dimensionally stable and their raised portions tend to lose their three-dimensional structure when stressed after a period of time depending on the application.

U.S. Pat. Nos. 5,098,764 and 5,244,711 disclose the use of a support member in a more recent method of producing nonwoven webs or products. The support members have a topographical feature configuration as well as an array of apertures. In this process, a starting web of fiber is positioned on the topographical support member. The support member with the fibrous web thereon is passed under jets of high pressure fluid, typically water. The jets of water cause the fiber to intertwine and entangle with each other in a particular pattern, based on the topographical configuration of the support member.

The pattern of topographical features and apertures in the support member is critical to the structure of the resulting nonwoven product. In addition, the support member must have sufficient structural integrity and strength to support a fibrous web while fluid jets rearrange the fibers and entangle them in their new arrangement to provide a stable fabric. The support member must not under go any substantial distortion under the force of the fluid jets. Also, the support member must have means for removing the relatively large volumes of entangling fluid so as to prevent "flooding" of the fibrous web, which would interfere with effective entangling. Typically, the support member includes drainage apertures which must be of a sufficiently small size to maintain the integrity of the fibrous web and prevent the loss of fiber through the forming surface. In addition, the support member should be substantially free of burrs, hooks or the like irregularities that could interfere with the removal of the entangled fibrous nonwoven therefrom. At the same time, the support member must be such that fibers of the fibrous web being processed thereon are not washed away (i.e. good fiber retention and support) under the influence of the fluid jets.

One of the main problems which arises during the production of nonwovens is that of achieving the cohesion of the fibers making up the nonwoven in order to give the nonwoven products the strength characteristics according to the application in question, while maintaining or imparting particular physical characteristics, such as bulk, hand, appearance, etc.

The properties of bulk, absorbency, strength, softness, and aesthetic appearance are indeed important for many products when used for their intended purpose. To produce a nonwoven product having these characteristics, a support member will often be constructed such that the sheet contact surface exhibits topographical variations.

It should be appreciated that these support members (fabrics, belts, sleeves) may take the form of endless loops and function in the manner of conveyors. It should further be appreciated that nonwoven production is a continuous process which proceeds at considerable speeds. That is to say, the elementary fibers or webs are continuously deposited onto a forming fabric/belt in the forming section, while a newly entangled nonwoven fabric is continuously being transferred from the support member to a subsequent process.

SUMMARY OF THE INVENTION

The present invention provides an alternative solution to the problems addressed by prior-art patents/patent applications discussed above.

The instant invention provides an improved belt or sleeve that functions in place of a traditional belt or sleeve, and imparts desired physical characteristics, such as bulk, appearance, texture, absorbency, strength, and hand to the nonwoven products produced thereon.

It is therefore a principal object of the invention to provide a spunlacing or hydroentangling support member such as a belt or sleeve that has through voids in a desired pattern.

It is a further object to provide a belt or sleeve that may have a topography or texture to one or both surfaces, produced using any of the means know in the art, such as for example, sanding, graving, embossing or etching. These and other objects and advantages are provided by the instant invention. Other advantages such as, but not limited to, improved fiber support and release (no picking) over prior art woven fabrics, and easier cleanability as a result of no yarn crossovers to trap elementary fibers are provided.

If the belt/sleeve has a surface texture, then more effective patterning/texture is transferred to the nonwoven, and it also results in better physical properties such as bulk/absorbency.

The present invention relates to an endless support member such as a belt or sleeve for supporting and conveying natural, artificial or synthetic fibers in a spunlace or hydroentanglement process. The instant porous structures, belts, or sleeves exhibit the following non-limiting advantages over calendaring technology: fabric sleeves are a relatively less expense item with no large capital investment in fixed equipment; patterning is accomplished during the entangling process itself, eliminating the need for a separate calendaring process; lower material content in the final product can be achieved as caliper/thickness is not degraded from compression; the finished product can be produced with higher bulk as it is not compressed at a calendaring stage. To the nonwoven rolled-goods producer, these process advantages further lead to the end product advantages of Lower cost spunlace or hydroentangled webs with desired patterns, marks, or texture; the ability to customize products as the size/length of the production run for particular products is reduced; production of higher performance products, such as, products with high bulk imparts the characteristic of higher absorbency, which is of great value in consumer applications.

In an exemplary embodiment, the endless belt or sleeve is formed from strips of material that are spiral wound around two rolls in a side to side abutting manner. The strips are firmly attached to each other by a suitable method to form an endless loop at the required length and width for the particular use. In the case of a sleeve, the strips may be wound around the surface of a single roll or mandrel which is approximately the size of the diameter and CD length of the drum on which the sleeve will be used. The strips of material used are commonly produced as industrial strapping material. Strapping, especially plastic strapping material, is usually defined as a relatively thin plastic band used for fastening or clamping objects together. Surprisingly, it was discovered that this type of plastic material has the appropriate characteristics to be the material strips to form the inventive belt or sleeve.

The difference in definition between (plastic) strapping and monofilament is related to size, shape and application. Both strapping and monofilament are made by extrusion processes that have the same basic steps of extrusion, uniaxial orientation and winding. Monofilament is generally smaller in size than strapping and usually round in shape. Monofilament is used in a wide variety of applications such as fishing lines and industrial fabrics, including, papermachine clothing. Strapping is generally much larger in size than monofilament and always basically wider along a major axis, and as such, being rectangular in shape for its intended purpose.

It is well known in the art of extrusion that plastic strapping is made by an extrusion process. It is also well known that this process includes uniaxial orientation of the extruded material. It is also well known that there are two basic extrusion processes using uniaxial orientation. One process is the extrusion and orientation of a wide sheet that is slit into individual straps. The other process is the extrusion of individual strapping that is oriented. This second process is very much like the process of making monofilament as evidenced by the similarity in equipment for both processes.

An advantage of using strapping material versus monofilament is the number of spiral windings needed to produce a fabric. Monofilaments are usually considered to be yarns that are no larger than 5 mm in their largest axis. Uniaxial monofilament sizes used for paper machine clothing and the other uses aforementioned seldom exceed 1.0 mm in their largest axis. The strapping material used is usually at least 10 mm in width and sometimes exceeds 100 mm in width. It is envisioned that strapping up to 1000 mm in width could be also used. Suppliers of strapping material which may be used include companies such as Signode.

Yet another advantage is thickness versus tensile modulus. Polyester (PET) films in the prior art, for example, have a tensile modulus in the long axis (or machine direction—MD) of about 3.5 GPa. PET strapping (or ribbon) material has a tensile modulus ranging from 10 GPa to 12.5 GPa. To achieve the same modulus with a film, a structure would have to be 3 to 3.6 times thicker.

The invention therefore, according to one exemplary embodiment, is a fabric, belt or sleeve formed as a single or multi layer structure from these spiral wound ribbons. The fabric, belt or sleeve may have planar, smooth top and bottom surfaces. The belt or sleeve may also be textured in some manner using any of the means known in the art, such as for example, sanding, graving, embossing or etching. The belt or sleeve can be impermeable to air and/or water. The belt or sleeve can also be perforated by some mechanical or thermal (laser) means so it may be permeable to air and/or water.

In another exemplary embodiment, the ribbon is formed such that is has an interlocking profile. The belt or sleeve is formed by spirally winding these interlocking strips and would have greater integrity than just abutting parallel and/or perpendicular sides of adjacent ribbon strips. This belt or sleeve can also be impermeable to air and/or water or perforated to be made permeable.

While the embodiments above are for a single layer of strips of spirally wound ribbon, there may be advantages to use strips with various geometries that form a belt or sleeve of two or more layers. Therefore, according to one exemplary embodiment the belt or sleeve may have two or more layers where the strips may be formed such that the two or more layers mechanically interlock or are attached together by other means known to those skilled in the art. Again the structure can be either impermeable or perforated to be permeable to either air and/or water.

Another exemplary embodiment is a multilayer structure formed using the concept of a "welding strip" used to further improve the belt or sleeve integrity. The structure can be impermeable or perforated to be permeable to either air and/or water.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred, but non-limiting, embodiments of the invention are illustrated in the accompanying drawings in which corresponding components are identified by the same reference numerals.

While the term fabric and fabric structure is used, fabric, belt, conveyor, sleeve, support member, and fabric structure are used interchangeably to describe the structures of the present invention. Similarly, the terms strapping, ribbon, strip of material, and material strips are used interchangeably throughout the description.

Terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious (and within the ambit of the invention) from the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings:

FIGS. 5(a) through 5(c) are cross-sectional views taken in a widthwise direction of several embodiments of the strip of the material used to manufacture the inventive fabric, belt or sleeve;

FIGS. 8(a) through 8(c) are cross-sectional views taken in a widthwise direction of several embodiments of the strip of the material used to manufacture the inventive fabric, belt or sleeve;

DETAILED DESCRIPTION OF THE PREFERRED EMBODIMENTS

The instant invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

Figure 15:
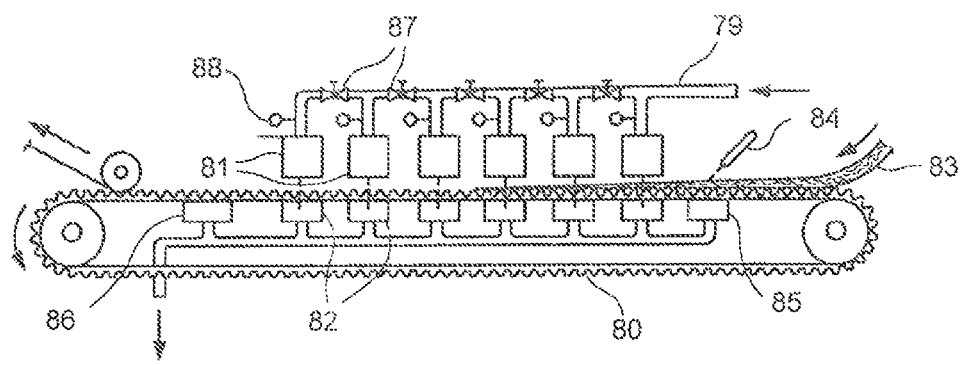
FIGS. 15 and 16 are schematic views of different types of apparatus for producing nonwoven webs using support members of the present invention.

The present invention provides a continuous support member such as an endless belt for use in the apparatus shown in FIG. 15, for example. The nonwoven support member functions in place of a traditional woven support member, and imparts desired texture, hand, and bulk to the nonwoven products produced thereon. The support member of the present invention may reduce the manufacturing time and costs associated with the production of nonwovens.

FIG. 15 depicts an apparatus for continuously producing nonwoven fabrics using a support member in accordance with the present invention. The apparatus of FIG. 15 includes a conveyor belt 80 which actually serves as the topographical support member in accordance with the present invention. The belt is continuously moved in a counterclockwise direction about a pair of spaced-apart rollers as is well known in the art. Disposed above belt 80 is a fluid ejecting manifold 79 connecting a plurality of lines or groups 81 of orifices. Each group has one or more rows of very fine diameter orifices, each about 0.007 inch in diameter with 30 such orifices per inch. Water is supplied to the groups 81 of orifices under a predetermined pressure and is ejected from the orifices in the form of very fine, substantially columnar, non-diverging streams or jets of water. The manifold is equipped with pressure gauges 88 and control valves 87 for regulating the fluid pressure in each line or group of orifices. Disposed beneath each orifice line or group is a suction box 82 for removing excess water, and to keep the area from undue flooding. The fiber web 83 to be formed into the nonwoven product is fed to the topographical support member conveyor belt of the present invention. Water is sprayed through an appropriate nozzle 84 onto the fibrous web to pre-wet the incoming web 83 and aid in controlling the fibers as they pass under the fluid ejecting manifolds. A suction slot 85 is placed beneath this water nozzle to remove excess water. Fibrous web passes under the fluid ejecting manifold in a counter clockwise direction. The pressure at which any given group 81 of orifices is operated can be set independently from the pressure at which any of the other groups 81 of orifices is operated. Typically, however, the group 81 of orifices nearest spray nozzle 84 is operated at a relatively low pressure, e.g. 100 psi. This assists in settling the incoming web onto the surface of the support member. As the web passes in the counterclockwise direction in FIG. 15, the pressures at which the groups 81 of orifices are operated is usually increased. It is not necessary that each succeeding group 81 of orifices be operated at a pressure higher than its neighbor in the clockwise direction. For example, two or more adjacent groups 81 of orifices could be operated at the same pressure, after which the next succeeding group 81 of orifices (in the counterclockwise direction) could be operated at a different pressure. Very typically, the operating pressures at the end of the conveyor belt where the web is removed are higher than the operating pressures where the web is initially fed into the conveyor belt. Though six groups 81 of orifices are shown in FIG. 15, this number is not critical, but will depend on the weight of the web, the speed, the pressures used, the number of rows of holes in each group, etc. After passing between the fluid ejecting manifold and the suction manifolds, the now formed nonwoven fabric is passed over an additional suction slot 86 to remove excess water. The distance from the lower surfaces of the groups 81 of orifices to the upper surface of fibrous web 83 typically ranges from about 0.5 inch to about 2.0 inches; a range of about 0.75 inch to about 1.0 inch is preferred. It will be apparent that the web cannot be spaced so closely to the manifold that the web contacts the manifold. On the other hand, if the distance between the lower surfaces of the orifices and the upper surface of the web is too great, the fluid streams will lose energy and the process will be less efficient.

Figure 16:
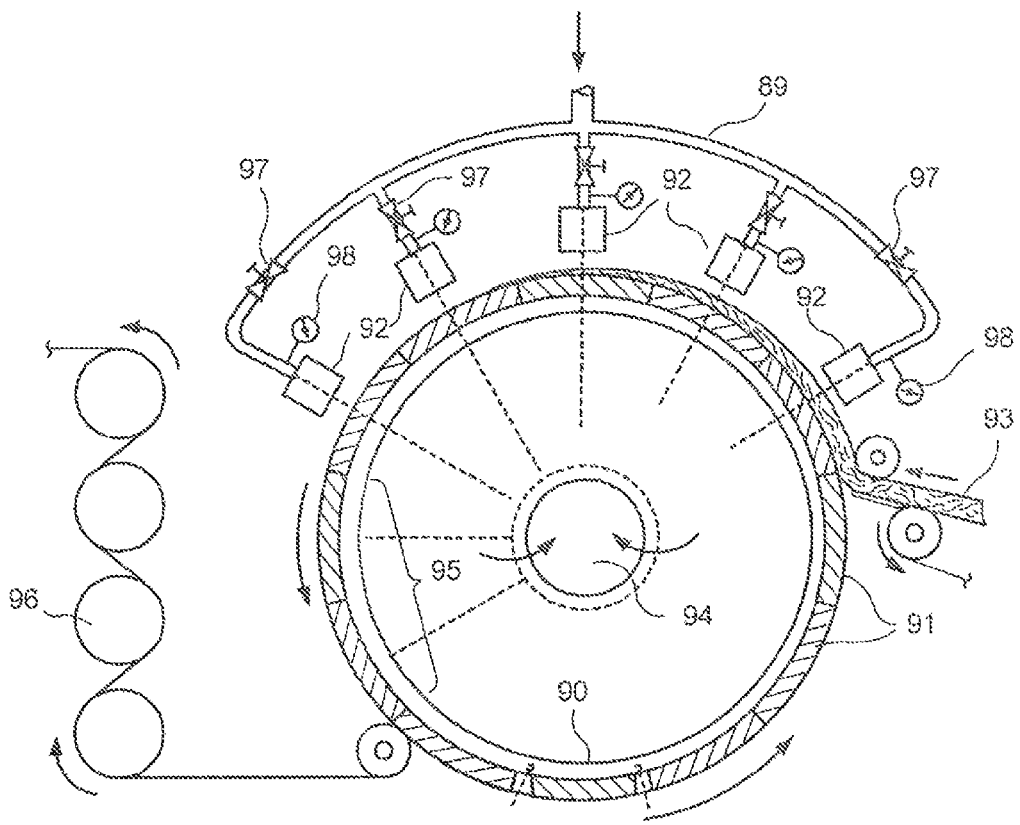

A preferred apparatus for producing nonwoven fabrics using support members of the present invention is schematically depicted in FIG. 16. In this apparatus, the topographical support member is a rotatable drum sleeve 91. The drum under the drum sleeve 91 rotates in a counterclockwise direction. The outer surface of the drum sleeve 91 comprises the desired topographical support configuration. Disposed about a portion of the periphery of the drum is a manifold 89 connecting a plurality of orifice strips 92 for applying water or other fluid to a fibrous web 93 placed on the outside surface of the curved plates. Each orifice strip may comprise one or more rows of very fine diameter holes or apertures of the type mentioned earlier herein. Typically, the apertures are approximately 0.005 inches to 0.01 inches in nominal diameter, for example. Other sizes, shapes and orientations may obviously be utilized, if suitable for the purpose. Also, there may be, for example, as many as 50 or 60 holes per inch or more if desired. Water or other fluid is directed through the rows of orifices. In general, and as explained above, the pressure in each orifice group is typically increased from the first group under which the fibrous web passes to the last group. The pressure is controlled by appropriate control valves 97 and is monitored by pressure gauges 98. The drum is connected to a sump 94 on which a vacuum may be pulled to aid in removing water and to keep the area from flooding. In operation, the fibrous web 93 is placed on the upper surface of the topographical support member before the water ejecting manifold 89 as seen in FIG. 16. The fibrous web passes underneath the orifice strips and is formed into a nonwoven product. The formed nonwoven is then passed over a section 95 of the apparatus 95 where there are no orifice strips, but vacuum is continued to be applied. The fabric after being de-watered is removed from the drum and passed around a series of dry cans 96 to dry the fabric.

Turning now to the structure of the support members, belts, or sleeves, the support members may have a pattern of through voids. The through voids may include, among other things, geometrical characteristics that provide enhanced topography and bulk to the nonwoven products or web when produced, for example, on a support member, belt, or sleeve. Other advantages of the instant support members include easier web release, improved contamination resistance, and reduced fiber picking. Yet another advantage is that it avoids the constraints of and need for a conventional weaving loom since the through voids can be placed in any desired location or pattern. The support member may also have a texture on one or both surfaces produced using any of the means known in the art, such as for example, by sanding, graving, embossing, or etching.

It will be appreciated that the term "through void" is synonymous to the term "through hole" and represents any opening that passes entirely through a support member such as a belt or sleeve. A support member as referred to herein includes, but is not limited to, industrial fabrics such as belts or conveyors, and sleeves or cylindrical belts specifically used in nonwoven production. As mentioned earlier, while the term fabric and fabric structure is used to describe the preferred embodiments, fabric, belt, conveyor, sleeve, support member, and fabric structure are used interchangeably to describe the structures of the present invention.

Figure 1:
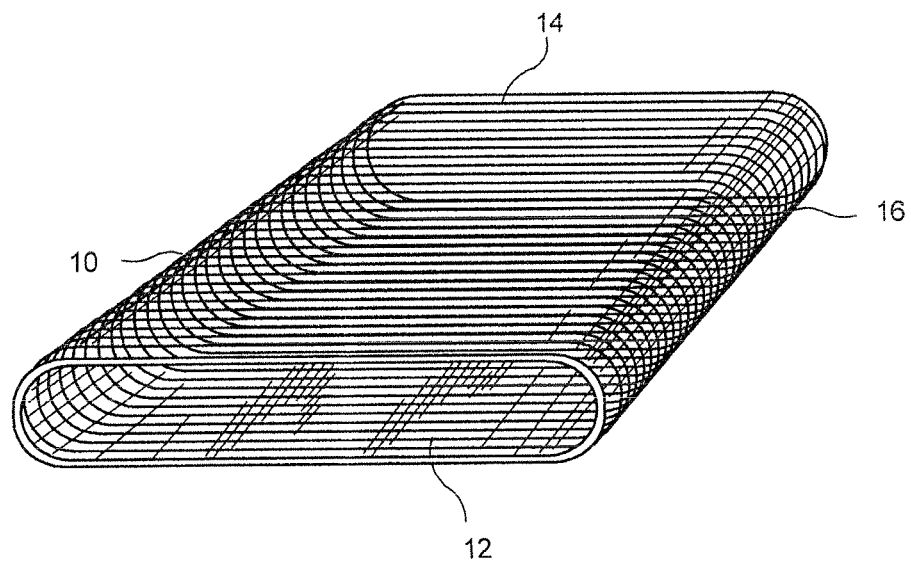
FIG. 1 is a perspective view of a fabric, belt or sleeve according to one aspect of the present invention.

FIG. 1 is a perspective view of the industrial fabric, belt or sleeve 10 of the present invention. The fabric, belt or sleeve 10 has an inner surface 12 and an outer surface 14, and is fashioned by spirally winding a strip of polymeric material 16, for example an industrial strapping material, in a plurality of abutting and mutually adjoined turns. The strip of material 16 spirals in a substantially longitudinal direction around the length of the fabric, belt or sleeve 10 by virtue of the helical fashion in which the fabric, belt or sleeve 10 is constructed.

Figure 2:
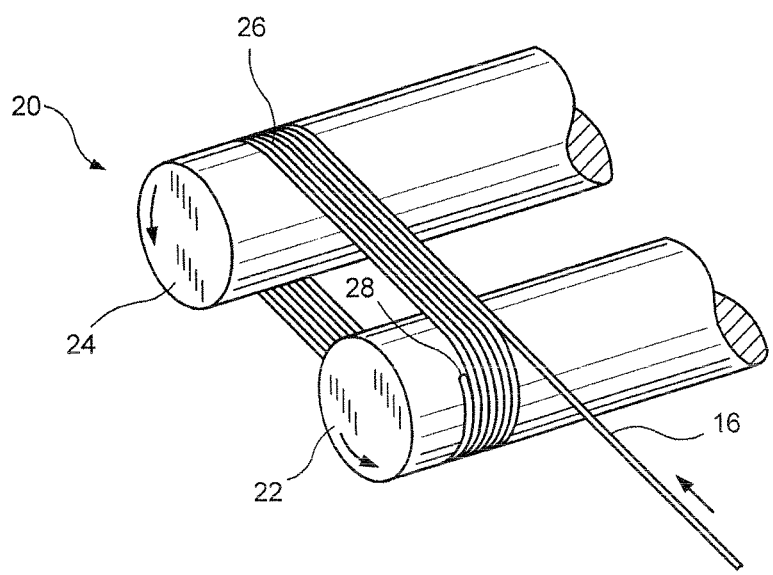
FIG. 2 illustrates a method by which the fabric, belt or sleeve of the present invention may be constructed.

An exemplary method by which the fabric, belt or sleeve 10 may be manufactured is illustrated in FIG. 2. Apparatus 20 includes a first process roll 22 and a second process roll 24, each of which is rotatable around its longitudinal axis. The first process roll 22 and the second process roll 24 are parallel to one another, and are separated by a distance which determines the overall length of the fabric, belt or sleeve 10 to be manufactured thereon, as measured longitudinally therearound. At the side of the first process roll 22, there is provided a supply reel (not shown in the figures) rotatably mounted about an axis and displaceable parallel to process rolls 22 and 24. The supply reel accommodates a reeled supply of the strip of material 16 having a width of 10 mm or more, for example. The supply reel is initially positioned at the left-hand end of the first process roll 12, for example, before being continuously displaced to the right or other side at a predetermined speed.

To begin the manufacture of the fabric, belt or sleeve 10, the beginning of the strip of polymeric strapping material 16 is extended in taut condition from the first process roll 22 toward the second process roll 24, around the second process roll 24, and back to the first process roll 22 forming a first coil of a closed helix 26. To close the first coil of the closed helix 26, the beginning of the strip of material 16 is joined to the end of the first coil thereof at point 28. As will be discussed below, adjacent turns of the spirally wound strip of material 16 are joined to one another by mechanical and/or adhesive means.

Therefore, subsequent coils of closed helix 26 are produced by rotating first process roll 22 and second process roll 24 in a common direction as indicated by the arrows in FIG. 2, while feeding the strip of material 16 onto the first process roll 22. At the same time, the strip of material 16 being freshly wound onto the first process roll 22 is continuously joined to that already on the first process roll 22 and the second process roll 24 by, for example, mechanical and/or adhesive or any other suitable means to produce additional coils of closed helix 26.

This process continues until the closed helix 26 has a desired width, as measured axially along the first process roll 22 or the second process roll 24. At that point, the strip of material 16 not yet wound onto the first process roll 22 and the second process roll 24 is cut, and the closed helix 26 produced therefrom is removed from the first process roll 22 and the second process roll 24 to provide the fabric, belt or sleeve 10 of the present invention.

Although a two roll set up is described herein, it may be apparent to one of ordinary skill in the art that the strips may be wound around the surface of a single roll or mandrel to form the instant fabric, belt or sleeve. A roll or mandrel of appropriate size may be selected based on the desired dimension of the fabric, belt or sleeve to be produced.

The present method for producing fabric, belt or sleeve 10 is quite versatile and adaptable to the production of nonwoven and/or industrial fabrics or belt or sleeves of a variety of longitudinal and transverse dimensions. That is to say, the manufacturer, by practicing the present invention, need no longer produce a woven fabric of appropriate length and width for a given nonwoven production machine. Rather, the manufacturer need only separate the first process roll 22 and the second process roll 24 by the appropriate distance, to determine the approximate length of the fabric, belt or sleeve 10, and wind the strip of material 16 onto the first process roll 22 and the second process roll 24 until the closed helix 26 has reached the approximate desired width.

Further, because the fabric, belt or sleeve 10 is produced by spirally winding a strip of polymeric strapping material 16, and is not a woven fabric, the outer surface 12 of the fabric, belt or sleeve 10 can be smooth and continuous, and lacks the knuckles which prevent the surfaces of a woven fabric from being perfectly smooth. The fabrics, belts, or sleeves of the present invention may, however, have geometrical characteristics that provide enhanced topography and bulk to the nonwoven product produced thereon. Other advantages of the instant support members include easier web release, improved contamination resistance, and reduced fiber picking. Yet another advantage is that it avoids the constraints of and need for a conventional weaving loom since the through voids can be placed in any desired location or pattern. The fabric, belt or sleeve may also have a texture on one or both surfaces produced using any of the means known in the art, such as for example, by sanding, graving, embossing or etching. Alternatively, the fabric, belt or sleeve may be smooth on one or both surfaces.

Figure 3A:
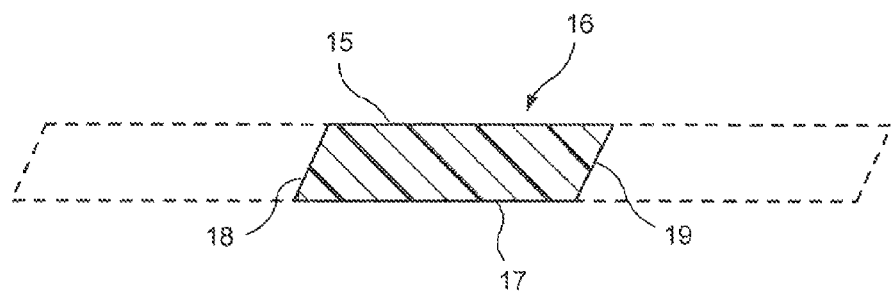
FIGS. 3(a) through 3(i) are cross-sectional views taken in a widthwise direction of several embodiments of the strip of the material used to manufacture the inventive fabric, belt or sleeve.

FIGS. 3(a) through 3(i) are cross-sectional views, taken in a widthwise direction, of several embodiments of the strip of material used to produce the present fabric, belt or sleeve. Each embodiment includes upper and lower surfaces which may be flat (planar) and parallel to one another, or may have a certain profile intended to suit a particular application. Turning to FIG. 3(a), material strip 16 has an upper surface 15, a lower surface 17, a first planar side 18 and a second planar side 19, according to one embodiment of the invention. The upper surface 15 and the lower surface 17 may be flat (planar) and parallel to one another, and the first planar side 18 and the second planar side 19 may be slanted in parallel directions, so that the first planar side 18 of each spirally wound strip of material 16 abuts closely against the second planar side 19 of the immediately preceding turn thereof. Each turn of the strip of material 16 is joined to its adjacent turns by joining their respective first and second planar sides 18, 19 to one another by an adhesive, for example, which may be a heat-activated, room-temperature-cured (RTC) or hot-melt adhesive, for example, or any other suitable means.

Figure 3B:
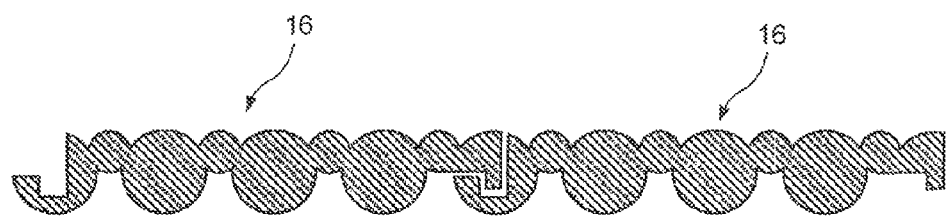
Figure 3C:
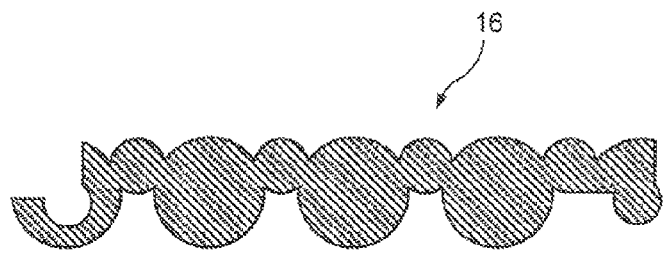
Figure 3D:
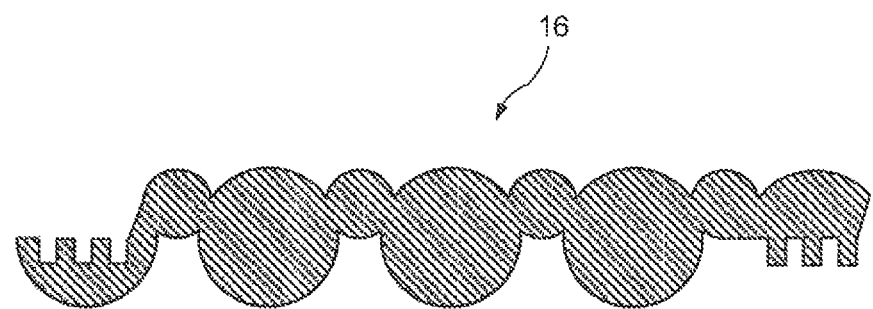
Figure 3E:
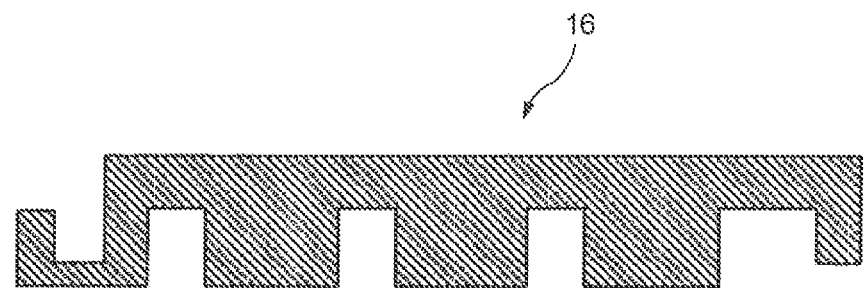
Figure 3F:
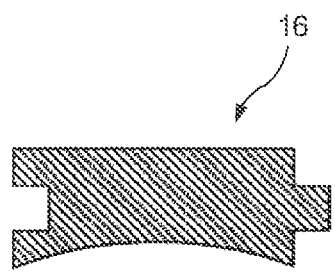
Figure 3G:
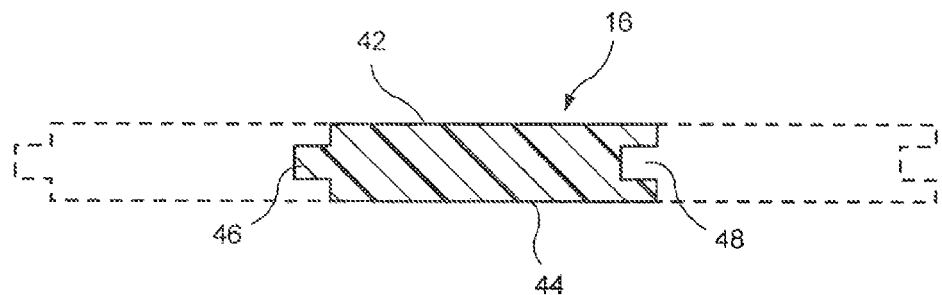

In FIG. 3(b), material strip 16 may have a cross-sectional structure that enables a mechanical interlock for joining adjacent strips of material 16 in the spirally formed fabric, belt or sleeve. Adjacent strips of material 16 can be the same or different in size and/or profile, but each has a locking position, as shown in FIG. 3(b). Other examples of mechanical interlock structures are shown in FIGS. 3(c) through 3(g) where the cross section of individual strips of material 16 is illustrated. In each case, one side of the strip of material 16 may be designed to mechanically interlock or connect with the other side of the adjacent strip of material 16. For example, referring to the embodiment shown in FIG. 3(g), the strip of material 16 may have an upper surface 42, a lower surface 44, a tongue 46 on one side and a corresponding groove 48 on the other side. The tongue 46 may have dimensions corresponding to those of the groove 48, so that the tongue 46 on each spirally wound turn of strip 16 fits into the groove 48 of the immediately preceding turn thereof. Each turn of the strip of material 16 is joined to its adjacent turns by securing tongues 46 in the grooves 48. The upper surface 42 and the lower surface 44 may be flat (planar) and parallel to one another, or non-planar and non-parallel depending on the application, or even may be convexly or concavely rounded in the widthwise direction thereof, as shown in FIG. 3(f). Similarly, either sides of the strip may be cylindrically convex or concave shaped with the same radius of curvature.

Figure 3H:
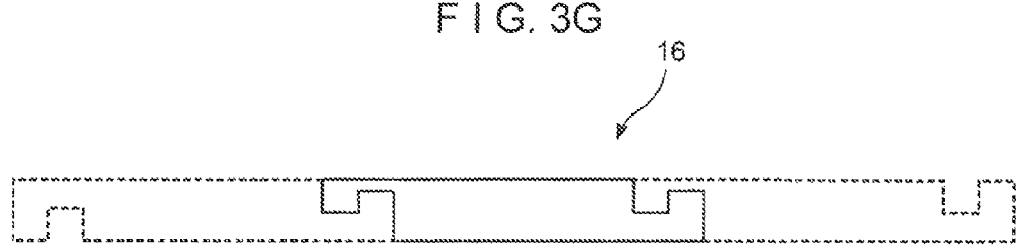

FIG. 3(h) shows another embodiment of the present invention.

Figure 3I:
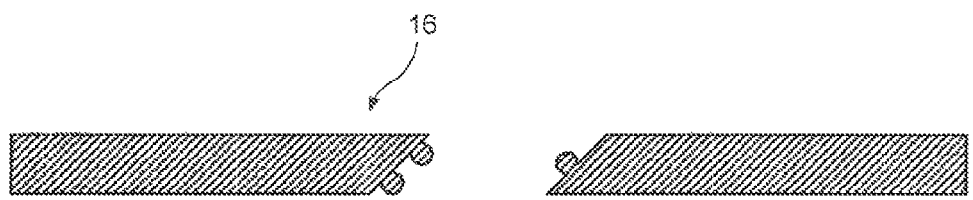

In addition to having an extruded strip of material with opposing hemispheres or profiles as described above, various other shapes could be extruded or machined from rectangular extrusions to have mating edges with raised rails, which may facilitate bonding by mechanical and/or adhesive means. One such structure, according to one exemplary embodiment of the invention is shown in FIG. 3(i). Alternatively, the material strip may not require a right and left side that mate or join together. For example, as shown in FIG. 4(a), the cross section of strip of material 16 may have interlocking grooves on its upper surface or top side, or material strip 16 may have interlocking grooves on its lower surface or bottom side, as shown in FIG. 4(b).

Figure 4A:
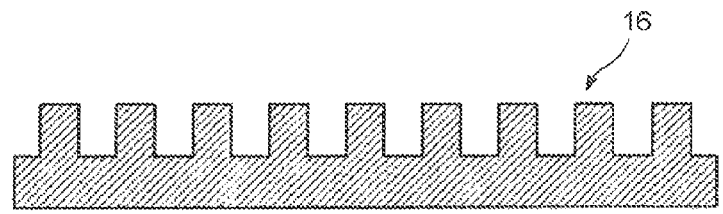
FIGS. 4(a) through 4(d) are cross-sectional views taken in a widthwise direction of several embodiments of the strip of the material used to manufacture the inventive fabric, belt or sleeve.
Figure 4B:
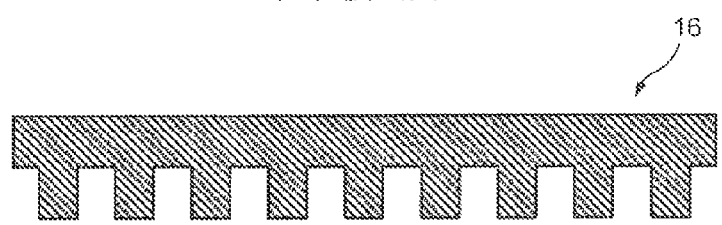
Figure 4C:
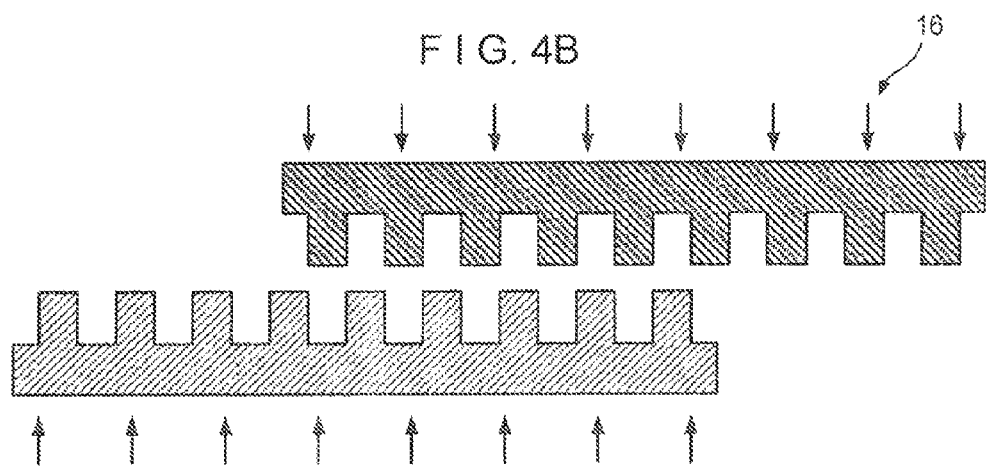
Figure 4D:
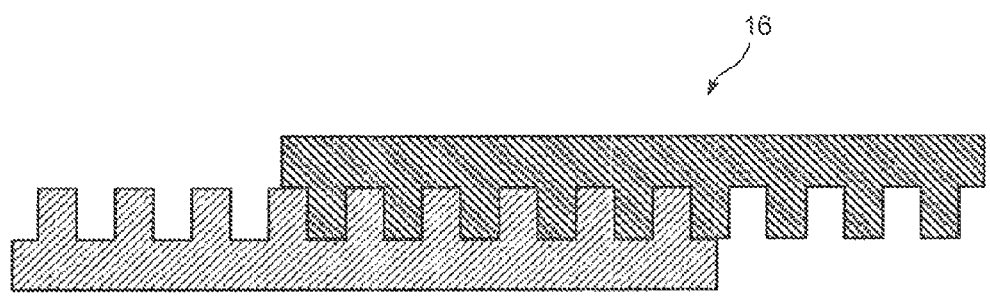

FIG. 4(c), for example, shows the material strips of FIGS. 4(a) and 4(b) positioned for interlocking. The arrows in FIG. 4(c) indicate, for example, the direction that each of the material strips 16 would have to be moved in order to engage the grooves and interlock the two strips. FIG. 4(d) shows the two material strips 16 after they have been interlocked or joined together. Although only two of the mating material strips are shown in the exemplary embodiments, it should be noted that the final fabric, belt or sleeve is formed of several of the material strips interlocked together. Clearly, if one interlocks the material strips in a spiral winding process, one can form a sheet of material in the form of an endless loop. It should also be noted that while mechanical interlocks are shown, the strength of the interlocks can be improved by, for example, thermal bonding, especially by a technique known as selective bonding as exemplified by a commercial process known as 'Clearweld' (See www.clearweld.com).

FIG. 5(a) shows a cross-sectional view of a material strip 16 that has grooves both on the top side and bottom side thereof. FIG. 5(b) shows how two material strips 16 having the cross-sectional shape shown in FIG. 5(a) can be interlocked. The interlocked structure results in grooves on the top and bottom surface of the end product.

Referring to the embodiment shown in FIG. 5(c), FIG. 5(c) shows the interlocking of the two material strips 16 shown in FIG. 5(a) and FIG. 4(b). This results in a sheet product that has grooves on the bottom surface with a flat top surface. Likewise, one may also form a structure having grooves on the top surface with a flat bottom surface.

Figure 6A:
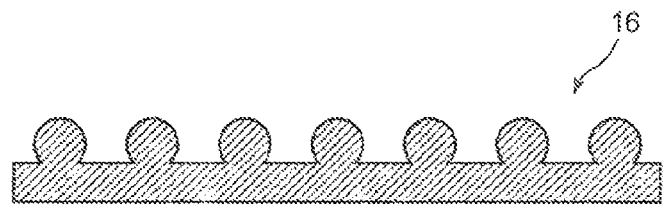
FIGS. 6(a) through 6(d) are cross-sectional views taken in a widthwise direction of several embodiments of the strip of the material used to manufacture the inventive fabric, belt or sleeve.
Figure 6B:
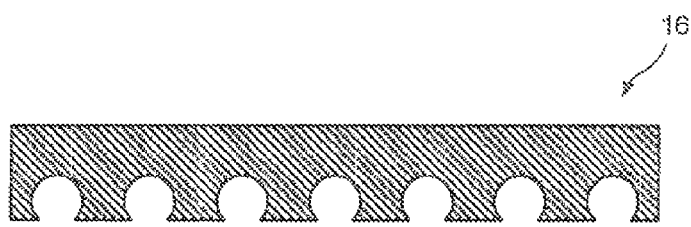
Figure 6C:
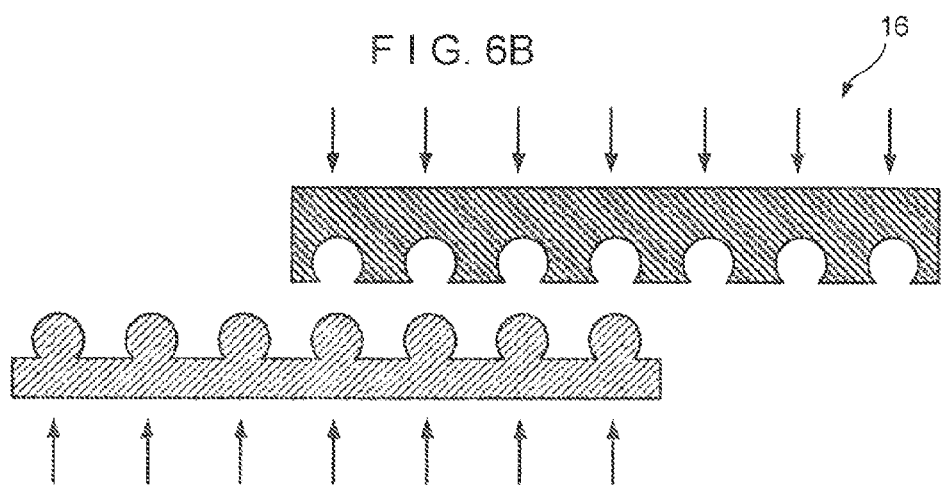
Figure 6D:
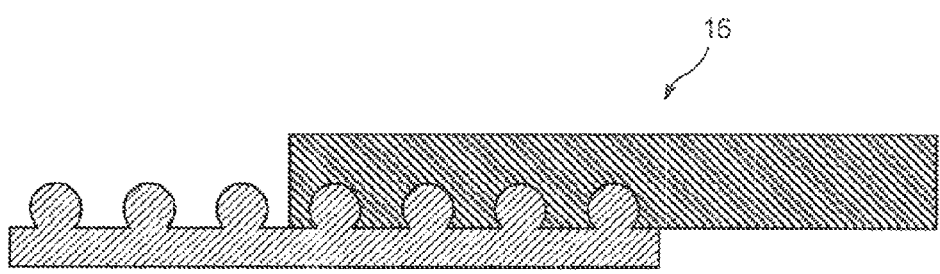

Another exemplary embodiment is a fabric, belt or sleeve formed from material strips 16 that have knob-like interlocks or "positive" locks that form stronger interlocks due to their mechanical design. The designs have "positive" interlocks in the sense that the pins and the receptors for the pins have mechanical interference that require considerable force either to join the ribbons together or to separate them. FIG. 6(a), for example, illustrates the features of knoblike interlocks in individual ribbon-like material strips 16. FIG. 6(b) illustrates the features of knoblike interlocks in individual ribbon-like material strips 16 of opposite configuration that are designed to interlock with the structure shown in FIG. 6(a). FIG. 6(c) shows the individual ribbon-like material strips of FIGS. 6(a) and 6(b) positioned for interlocking. It is to be noted here that the staggered position of the top and bottom ribbons is in order to accommodate another material strip 16 of opposite configuration. Finally, FIG. 6(d) illustrates these same strips after they have been pressed together to form an interlocked structure. Several ribbon-like material strips like these may be interlocked together to form the final fabric, belt or sleeve.

Figure 7A:
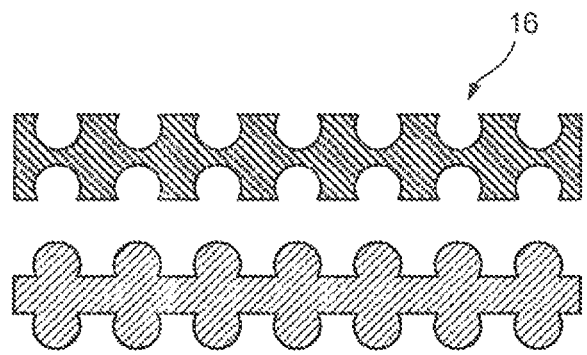
FIGS. 7(a) through 7(d) are cross-sectional views taken in a widthwise direction of several embodiments of the strip of the material used to manufacture the inventive fabric, belt or sleeve.
Figure 7B:
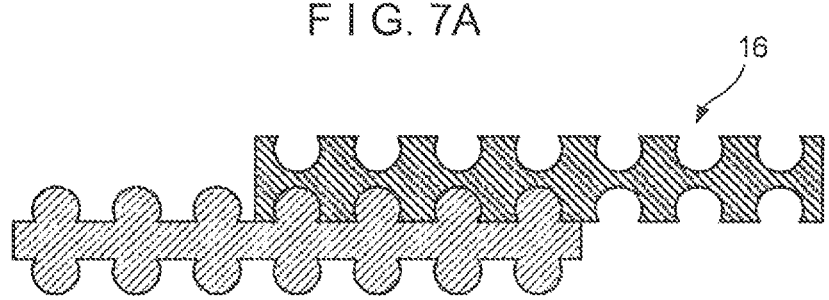

Another exemplary embodiment is a fabric, belt or sleeve formed from material strips 16 that have grooves on both the top and bottom sides thereof, for example, as shown in FIG. 7(a). These two ribbon-like material strips 16 are designed to be joined together to form a positive interlock, as shown in FIG. 7(b). It is to be noted that the top and bottom surfaces both retain grooves in their respective surfaces. Also, looking at FIGS. 7(a) and 7(b) it may be apparent to one of ordinary skill in the art to combine three strips to make a three-layered structure, or if just two strips are used, the groove profile of the grooves in the top strip may be different on top versus bottom sides. Similarly, the groove profile of the grooves in the bottom strip may be the same or different on either sides. As noted earlier, while the embodiments described herein are for a single layer of spirally wound ribbons or strips, there may be advantages to use strips with various geometries that form a belt of two or more layers. Therefore, according to one exemplary embodiment the belt may have two or more layers where the strips may be formed such that the two or more layers mechanically interlock. Each layer may be spirally wound in an opposite direction or angled in the MD to provide additional strength.

Figure 7C:
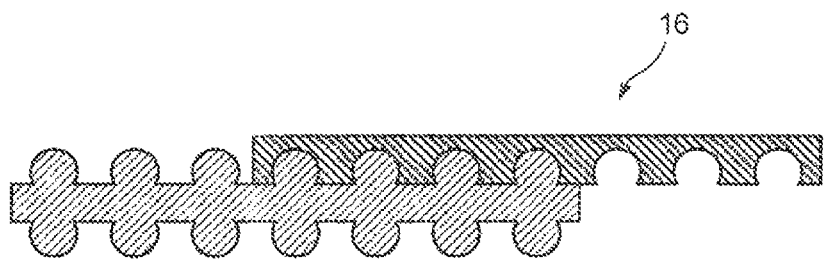
Figure 7D:
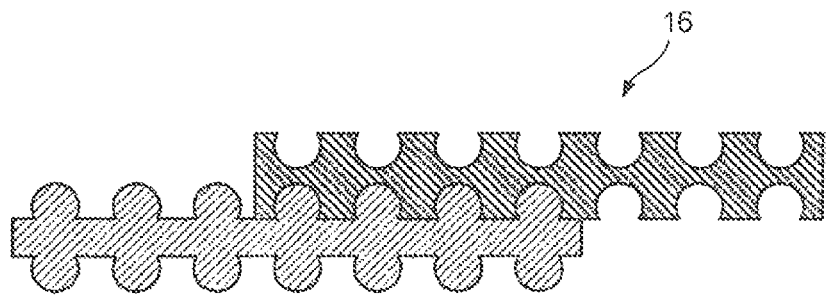

FIG. 7(c) shows an interlocked structure that results in a grooved bottom surface and a flat top surface, whereas FIG. 7(d) shows an interlocked structure that results in a flat bottom surface and a grooved top surface, for example.

As it may be obvious to one of ordinary skill in the art, many shapes may be considered for making positive interlocks as described above. For example, the previous few embodiments focused on round knob-like protrusions and round receptacles. However, it is also possible to use other shapes such as a trapezoid to accomplish the same effect. An example of a positive interlock having such a shape is shown in FIG. 8(a). Alternatively, one can mix shapes to accomplish a positive interlock. An example of mixed shapes is shown in FIGS. 8(b) and 8(c).

The mechanical interlock thus formed between adjacent strips of material as described in the above embodiments increases the ease with which a spiral wound base fabric or structure can be made, because without such a lock, it is possible for adjacent strips of material to wander and separate during the process of making the spirally wound fabric. By mechanically interlocking adjacent spirals, one may prevent wandering and separation between adjacent spirals. Additionally, one may not need to depend solely on the strength of the mechanical lock for joining strength as one may also form thermal welds in the mechanically locked zones of the fabric. According to one embodiment of the invention, this can be accomplished by placing a near infrared or infrared or laser absorbing dye prior to locking the male/female components together followed by exposing the mechanical lock to a near infrared or infrared energy or laser source that causes thermal welding of the mechanical lock without melting material external to the zone of the mechanical lock.

Figure 9:
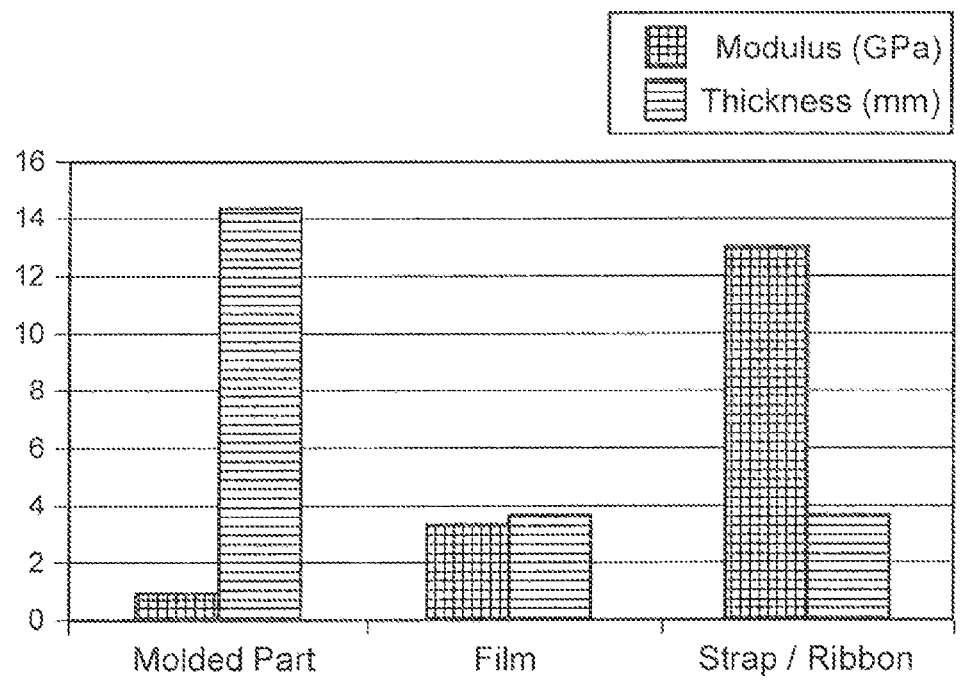
FIG. 9 is a bar graph depicting the advantages of using a uniaxially oriented material (strap/ribbon) over a biaxially oriented material (film) and an extruded material (molded part)
Figure 10A:
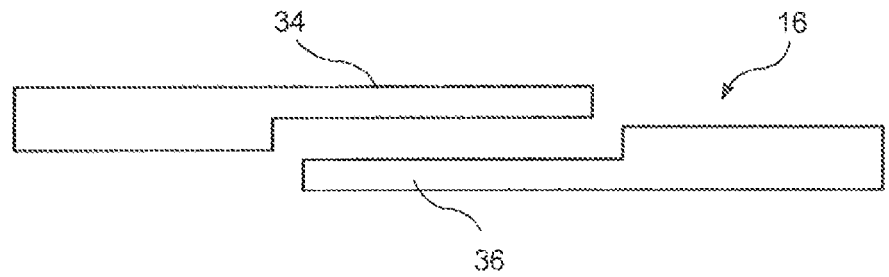
FIGS. 10(a) through 10(d) illustrate steps involved in a method by which the fabric, belt or sleeve of the present invention may be constructed.
Figure 10B:
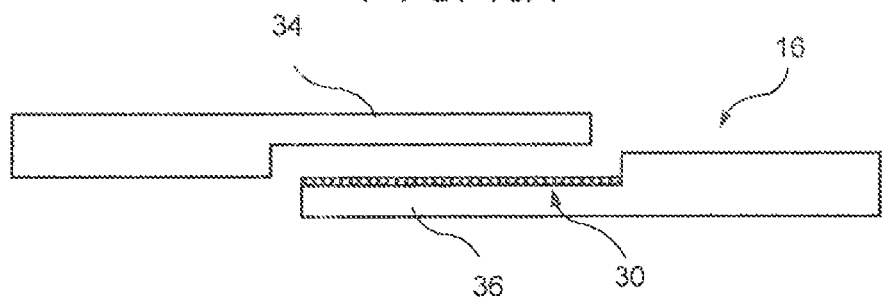
Figure 10C:
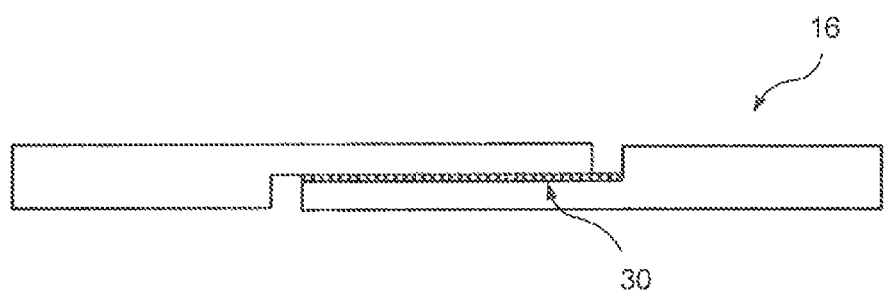
Figure 10D:
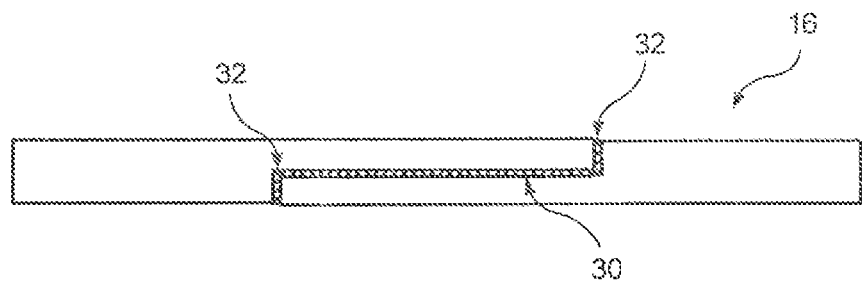

The strip of material described in the above embodiments may be extruded from any polymeric resin material known to those of ordinary skill in the art, such as for example, polyester, polyamide, polyurethane, polypropylene, polyether ether ketone resins, etc. While industrial strapping is attractive as a base material, given that it is uniaxally oriented, i.e., it has at least twice the tensile modulus of a biaxially oriented material (film) and up to ten times the modulus of an extruded material (molded), any other suitable material may be used. That is to say, the structure resulting from a uniaxially oriented material requires less than half the thickness of biaxially oriented material (film) and less than one-tenth the thickness of an extruded material (molded). This feature is illustrated in FIG. 9 where results are shown for designing a part that has been designed for a specific force and strain for a fixed width. The equation used in this design problem is the relationship between stress and strain shown as follows:

$$\frac{\text{FORCE}}{(\text{WIDTH} \times \text{THICKNESS})} = (\text{MODULUS} \times \text{STRAIN})$$

The force (or load) is kept constant along with the width and strain in this illustration. The equation shows that the required thickness is inversely proportional to the modulus of the material. This equation is representative of the problem of designing nonwoven production machine clothing for dimensional stability, i.e., the load is known, the maximum strain is known and the width of the machine is fixed. The result is shown in terms of the final thickness of the part required depending upon the modulus of the material employed. Clearly, uniaxial materials such as strappings or ribbons have a significant advantage over films and molded polymers as shown by FIG. 9. The instant support members, belts or sleeves, however, are not limited to uniaxial or biaxial orientation of the strapping, in that either or both orientations may be used in the practice of the instant invention.

According to one exemplary embodiment, the strip of material or strapping material described in the above embodiments may include a reinforcing material to improve the mechanical strength of the overall structure. For example, the reinforcing material may be fibers, yarns, monofilaments or multifilament yarns that can be oriented in the MD of the fabric, sleeve or belt, along the length of the strapping material. The reinforcing material may be included through an extrusion or pultrusion process where the fibers or yarns may be extruded or pultruded along with the material forming the strip of material or strapping material. They may be fully embedded within the material of the strapping or they may be partially embedded onto one or both surfaces of the strapping material, or both. Reinforcing fibers or yarns may be formed of a high-modulus material, such as for example, aramids, including but not limited to Kevlar® and Nomex®, and may provide extra strength, tensile modulus, tear and/or crack resistance, resistance to abrasion and/or chemical degradation to the strip of material or strapping material. Broadly, the reinforcing fibers or yarns may be made from thermoplastic and/or thermosetting polymers. Non-limiting examples of suitable fiber materials include glass, carbon, polyester, polyethylene, and metals such as steel. According to a further embodiment the melting temperature of said reinforcing fibers or yarns may be higher than the melting temperature of said strip of material or strapping material or vice versa.

Strapping is usually supplied in continuous lengths with the product having a rectangular cross section. It is a tough, general purpose, usually untreated polyester strip with excellent handling characteristics, which makes it suitable for many industrial applications. It has excellent mechanical strength and dimensional stability as noted earlier, and does not become brittle with age under normal conditions. Strapping has good resistance to moisture and most chemicals, and can withstand temperatures of –70 degrees C. to 150 degrees C. or more. Typical cross-sectional dimensions of a strapping material that may be used in the present invention are, for example, 0.30 mm (or more) thickness and 10 mm (or more) width. While strapping can be spirally wound, the adjacent wraps of strapping that do not have any means of interlocking to be held together may need to welded or joined in some manner. In such cases, laser welding or ultrasonic welding may be used in to fix or weld the adjacent ribbons or material strips together so as to improve cross-machine direction ("CD") properties, such as strength, and reducing the risk of separation of neighboring material strips.

While uniaxial strapping is found to have the maximum MD modulus, properties other than modulus may also be important. For example, if the MD modulus is too high for the strapping material, then crack and flex fatigue resistance of the final structure may be unacceptable. Alternatively, CD properties of the final structure may also be important. For instance, when referring to PET material and material strips of the same thickness, non-oriented strips may have a typical MD modulus of about 3 GPa and strength of about 50 MPa. On the other hand, a biaxially oriented strip may have a MD modulus of about 4.7 GPa and strength of about 170 MPa. It is found that modifying the processing of a uniaxial strip such that the MD modulus may be between 6-10 GPa and strength may be equal to or greater than 250 MPa, may result in a strip with CD strength approaching, approximately, 100 MPa. Further the material may be less brittle, i.e. it may not crack when repeatedly flexed, and may process better when joining the strips together. The bond between the strips may also resist separation during the intended use on the production machine.

One method to hold together the adjacent strips, according to one embodiment of the invention, is to ultrasonically weld adjacent strips edge to edge while simultaneously providing a sideways pressure to keep the edges in contact with each other. For example, one part of the welding device can hold one strip, preferably the strip that has already been wound into a spiral, down against a supporting roll while another part of the device pushes the other strip, preferably the strip being unwound, up against the strip being held down. This edge to edge welding is illustrated in FIG. 11(*a*), for example.

The application of ultrasonic gap welding results in a particularly strong bond. By contrast, ultrasonic welding in either a time mode or energy mode, which is also known as conventional ultrasonic welding, results in a bond that can be described as brittle. Therefore, it may be concluded that a bond formed via ultrasonic gap welding is preferred versus conventional ultrasonic welding.

Another exemplary method to hold together adjacent strips, according to one embodiment of the invention, is to apply an adhesive 30 to ends 34, 36 of adjacent strips 16, 16, and joining them is shown in FIGS. 10(*a*)-10(*d*). It is to be noted that a filler material 32, may be used to fill gaps or portions where the strips do not contact each other.

Figure 11A:
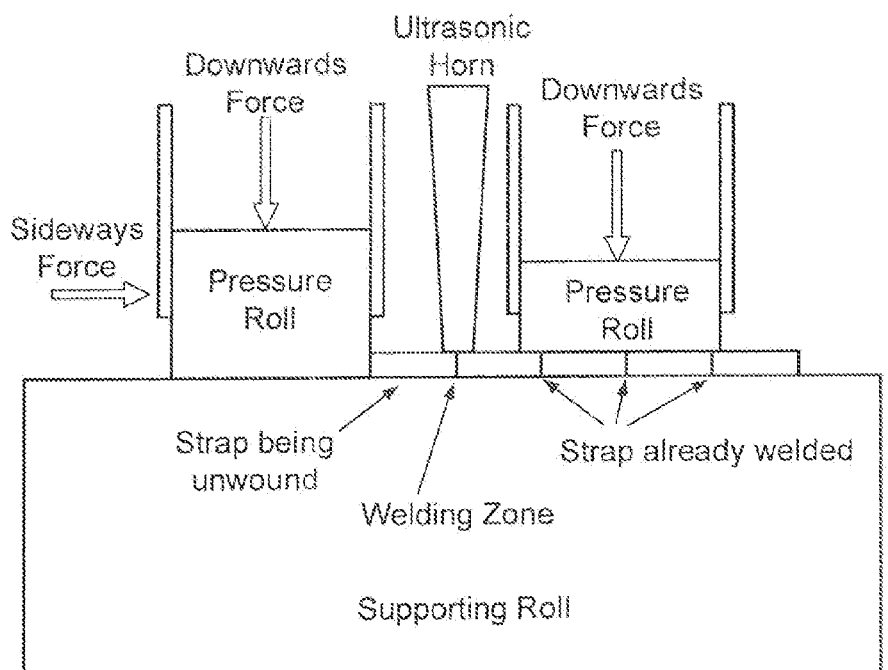
FIGS. 11(a) and 11(b) are schematics of an apparatus that may be used in forming the fabric, belt or sleeve according to one aspect of the present invention.
Figure 11B:
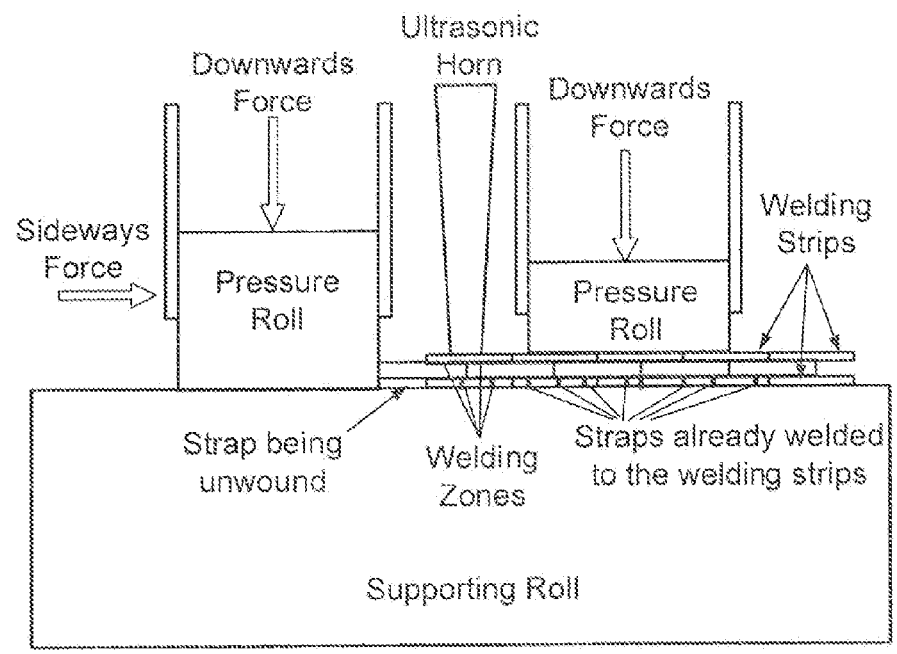
Figure 12:
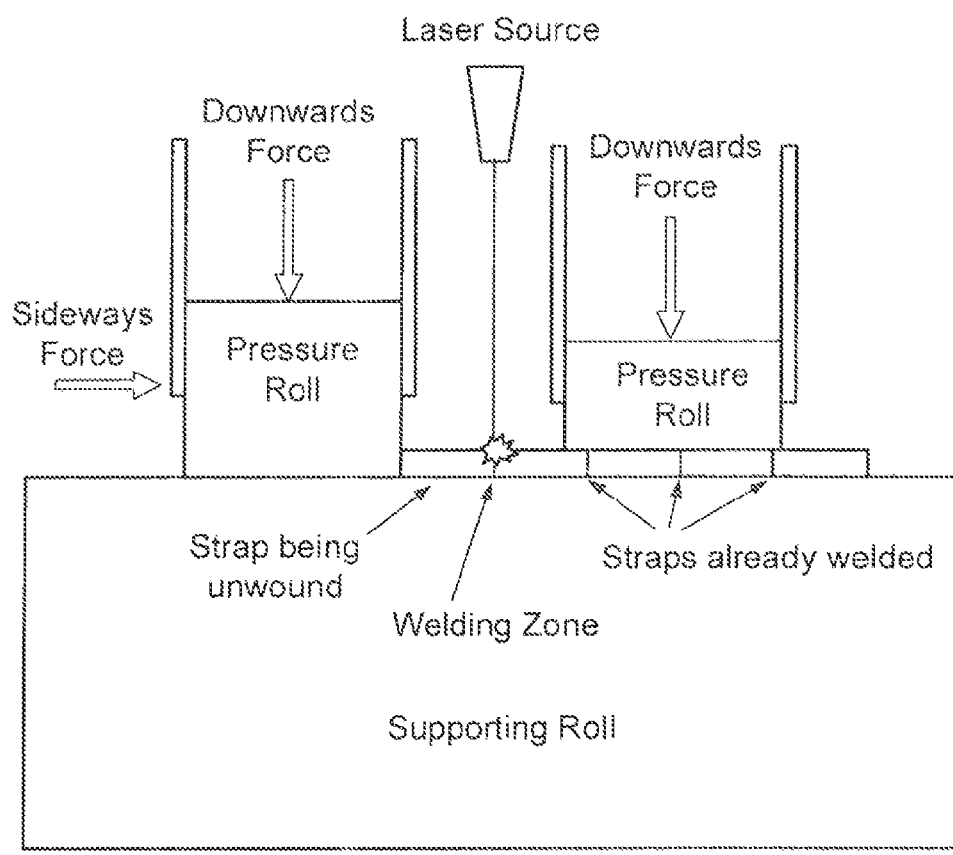
FIG. 12 is a schematic of an apparatus that may be used in forming the fabric, belt or sleeve according to one aspect of the present invention.

Another method to hold together adjacent strips of material or functional strips, according to one embodiment of the invention, is to use a "welding strip" comprised of the same basic material as the strip of material. For example, this welding strip is shown in FIG. 11(*b*) as a thin material appearing above and below the strips of material. In such an arrangement, the welding strip provides a material for the strips of material to be welded such that the assembled structure does not depend upon the edge to edge welding depicted in FIG. 11(a). Using the welding strip method, edge to edge welding may result; however, it is neither required nor preferred. Using the welding strip method, a "sandwich" or laminate type of structure may be formed with the horizontal surface of the strip of material being welded to the horizontal surface of the welding strip, as shown in FIG. 11(b). It is to be noted here that the welding strip does not have to be located both above and below the strips of material, in that the welding strip may be located either just above or just below the strips of material. According to one aspect, the welding strip may also be the central part of the sandwiched structure with the strip of material being above and/or below the welding strip. Additionally, the welding strip is shown as being thinner than the strip of material and as being the same width as the strip of material merely for exemplary purposes. The welding strip may well be narrower or broader than the strip of material, and may be of the same thickness or even thicker than the strip of material. The welding strip may also be another piece of strip of material rather than being a special material made solely for the purpose of the welding strip. The welding strip may also have adhesive applied to one of its surfaces to assist in holding the welding strip in place for the welding operation. However, if such an adhesive is used, it is preferred that the adhesive be partially applied to the welding strip versus the entire surface, because partial application may promote a strong weld between like materials (polyester to polyester, for example) of the strip of material and the welding strip upon ultrasonic or laser welding.

If the welding strip is made from an extruded polymer with no orientation, then it is preferred that the welding strip be much thinner than the strip of material, because a non-oriented extruded welding strip is less capable of maintaining the dimensional stability of the final structure as illustrated earlier in this disclosure. However, if the welding strip is made from an oriented polymer, it is preferred that the welding strip in combination with the strip of material be as thin as possible. As noted earlier, the welding strip may be another piece of strip of material. However, if this is the case, it is preferred that the thickness of the individual materials be selected such that the total thickness of the sandwich or laminate can be minimized. As also noted earlier, the welding strip may be coated with an adhesive that is used to hold the structure together for further processing. According to one aspect, the welding strip with adhesive may be used, for example, to create a structure that goes directly to a perforation step, which could be laser drilling without any ultrasonic bonding such that the laser drilling or laser perforation produces spot welds that can hold the sandwich structure together.

Another method to hold together adjacent strips of material, according to one embodiment of the invention, is to weld the adjacent strips using a laser welding technique.

Figure 14:
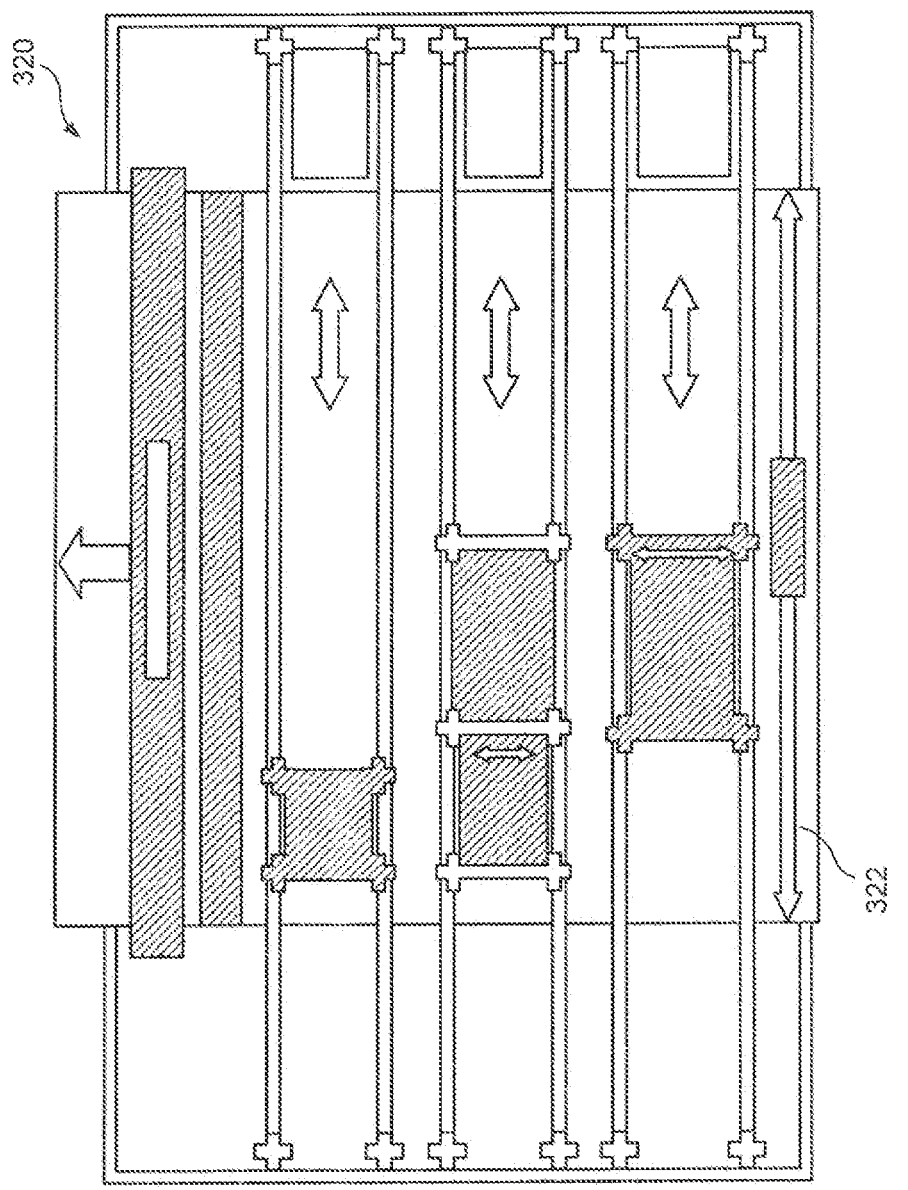
FIG. 14 is an apparatus used in the manufacture of a fabric, belt or sleeve according to one aspect of the present invention.

FIG. 14 illustrates an exemplary apparatus 320 that may be used in the laser welding process, according to one aspect of the invention. In this process, fabric, belt or sleeve 322 as shown in FIG. 14 should be understood to be a relatively short portion of the entire length of the final fabric, belt or sleeve. While the fabric, belt or sleeve 322 may be endless, it may most practically be mounted about a pair of rolls, not illustrated in the figure, but known to those of ordinary skill in the art. In such an arrangement, apparatus 320 may be disposed on one of the two surfaces, most conveniently the top surface, of the fabric 322 between the two rolls. Whether endless or not, fabric 322 may preferably be placed under an appropriate degree of tension during the process. Moreover, to prevent sagging, fabric 322 may be supported from below by a horizontal support member as it moves through apparatus 320.

Referring now more specifically to FIG. 14, where fabric 322 is indicated as moving in an upward direction through the apparatus 320 as the method of the present invention is being practiced. The laser heads that are used in the welding process may traverse across the fabric in a CD or widthwise "X" direction while the fabric may move in the MD or "Y" direction. It may also be possible to setup a system where the fabric is moved in three-dimensions relative to a mechanically fixed laser welding head.

The advantage of laser welding over ultrasonic welding is that laser welding can be accomplished at speeds in the range of 100 meters per minute while ultrasonic welding has a top end speed of about 10 meters per minute. The addition of a light absorptive dye or ink absorber to the edges of the strips may also assist in concentrating the thermal effect of the laser. Absorbers could be black ink or near IR dyes that are not visible to the human eye, such as for example those utilized by "Clearweld." (See www.clearweld.com)

Figure 13:
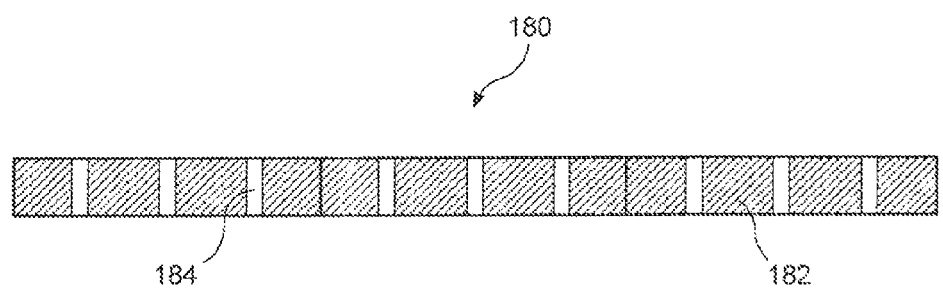
FIG. 13 is a cross-sectional view of a fabric, belt or sleeve according to one aspect of the present invention.

Once the final fabric, belt or sleeve is made and adjacent strips in the fabric, belt or sleeve have been welded or joined in some manner, holes or perforations allowing fluids (air and/or water) to pass from one side of the fabric to the other side of the fabric can be provided by means such as laser drilling. It should be noted that these through holes or perforations that allow fluid to pass from one side of the fabric to the other can be made either before or after the spiral winding and joining process. Such holes or perforations can be made via laser drilling or any other suitable hole/perforation making process, and can be of any size, shape, form and/or pattern, depending on the intended use. An exemplary embodiment is shown in FIG. 13, which is a cross section, taken in a transverse, or cross-machine, direction, of a fabric 80 of the present invention, strips of material 82 are provided along their entire lengths with a plurality of holes 84 for the passage of air and/or water.

The inventive fabric, as noted earlier, may be used as a process belt or sleeve used in airlaid, melt blowing, spunbonding, or hydroentangling processes. The inventive fabric, belt or sleeve may include one or more additional layers on top of or under the substrate formed using the strips of material, merely to provide functionality, and not reinforcement. For example, a MD yarn array may be laminated to the backside of the belt or sleeve to create void spaces. Alternatively, the one or more layers may be provided in between two layers of strapping. The additional layers used may be any of woven or nonwoven materials, MD or CD yarn arrays, spirally wound strips of woven material that have a width less than the width of the fabric, fibrous webs, films, or a combination thereof, and may be attached to the substrate using any suitable technique known to one of ordinary skill in the art. Needle punching, thermal bonding and chemical bonding are but few examples. The inventive fabric, belt or sleeve may also have a coating on either side for functionality. The texture on the fabric, belt or sleeve of the present invention may be produced before or after applying the functional coating. As aforementioned, the texture on the fabric, belt or sleeve can be produced using any of the means known in the art, such as for example, sanding, graving, embossing or etching.

Although preferred embodiments of the present invention and modifications thereof have been described in detail herein, it is to be understood that the invention is not limited to these precise embodiments and modifications, and that other modifications and variations may be effected by one skilled in the art without departing from the spirit and scope of the invention as defined by the appended claims.

What is claimed is:

1. A belt or sleeve for use in nonwoven production, said belt or sleeve comprising:
one or more spirally wound strips of polymeric material, wherein said one or more strips of polymeric material is an industrial strapping or ribbon material, wherein the strapping or ribbon material has at least twice the tensile modulus of a biaxially oriented material and up to ten time the modulus of an extruded material, and wherein said industrial strapping or ribbon material includes a reinforcing material oriented in the MD of the belt or sleeve selected from the group consisting of fibers, yarns, monofilaments and multifilament yarns.

2. The belt or sleeve according to claim 1, wherein said belt or sleeve is used in airlaid, melt blowing, spunbonding, or hydroentangling process.

3. The belt or sleeve according to claim 1, wherein said industrial strapping or ribbon material has a thickness of 0.30 mm or more, and a width of 10 mm or more.

4. The belt or sleeve according to claim 1, wherein said belt or sleeve is permeable or impermeable to air and/or water.

5. The belt or sleeve according to claim 4, wherein said belt or sleeve is permeable to air and/or water, and through voids or holes in said belt or sleeve are created using a mechanical or thermal means.

6. The belt or sleeve according to claim 5, wherein said through voids or holes are formed in a predetermined size, shape or orientation.

7. The belt or sleeve according to claim 6, wherein said through voids or holes have a nominal diameter in the range of 0.005 inches to 0.01 inches or more.

8. The belt or sleeve according to claim 1, further comprising one or more layers of woven or nonwoven materials, MD or CD yarn arrays, spirally wound strips of woven material having a width less than the width of the belt or sleeve, fibrous webs, films, or a combination thereof.

9. The belt or sleeve according to claim 1, wherein adjacent strips of polymeric material are mechanically interlocked.

10. The belt or sleeve according to claim 1, wherein said belt or sleeve has a texture on one or both surfaces.

11. The belt or sleeve according to claim 10, wherein said texture is provided by sanding, graving, embossing or etching.

12. The belt or sleeve according to claim 1, wherein said belt or sleeve is smooth on one or both surfaces.

13. The belt or sleeve according to claim 1, wherein said belt or sleeve comprises at least two layers of strapping materials spirally wound in opposite directions to each other, or opposite to the MD.

14. The belt or sleeve according to claim 1, further comprising a functional coating on one or both sides of the belt or sleeve.

15. The belt or sleeve according to claim 8, wherein said one or more layers is provided on one or both sides of the belt or sleeve, or in between two layers of strapping.

16. The belt or sleeve according to claim 14, wherein the functional coating has a texture on its top surface.

17. The belt or sleeve according to claim 1, wherein said fibers, yarns, monofilaments and multifilament yarns are made of a material selected from the group consisting of aramids, thermoplastic polymers, thermosetting polymers, glass, carbon, and steel.

18. A method for forming a belt or sleeve for use in nonwoven production, the method comprising the steps of:
spirally winding one or more strips of polymeric material around a plurality of rolls, wherein said one or more strips of polymeric material is an industrial strapping or ribbon material;
joining edges of adjacent strips of material using a predetermined technique, wherein the strapping or ribbon material has at least twice the tensile modulus of a biaxially oriented material and up to ten time the modulus of an extruded material; and
reinforcing said industrial strapping or ribbon material in the MD of the belt or sleeve with fibers, yarns, monofilaments or multifilament yarns.

19. The method according to claim 18, wherein said predetermined technique is laser, infrared or ultrasonic welding.

20. The method according to claim 18, wherein said industrial strapping or ribbon material has a thickness of 0.30mm or more, and a width of 10 mm or more.

21. The method according to claim 18, wherein said belt or sleeve is made permeable or impermeable to air and/or water.

22. The method according to claim 21, wherein said belt or sleeve is made permeable to air and/or water by creating through voids or holes in said belt or sleeve using a mechanical or thermal means.

23. The method according to claim 22, wherein said through voids or holes are formed in a predetermined size, shape or orientation.

24. The method according to claim 23, wherein said through voids or holes have a nominal diameter in the range of 0.005 inches to 0.01 inches or more.

25. The method according to claim 18, further comprising the step of:
applying to an upper or lower surface of said belt or sleeve one or more layers of woven or nonwoven materials MD or CD yarn arrays, spirally wound strips of woven material having a width less than the width of the belt or sleeve, fibrous webs, films, or a combination thereof.

26. The method according to claim 18, wherein adjacent strips of polymeric material are mechanically interlocked.

27. The method according to claim 18, wherein said belt or sleeve is provided with a texture on one or both surfaces.

28. The method according to claim 27, wherein said texture is provided by sanding, graving, embossing or etching.

29. The method according to claim 18, wherein said belt or sleeve is smooth on one or both surfaces.

30. The method according to claim 18, wherein said belt or sleeve comprises at least two layers of strapping materials spirally wound in opposite directions to each other, or opposite to the MD.

31. The method according to claim 18, further comprising the step of coating on one or both sides of the belt or sleeve with a functional coating.

32. The method according to claim 25, wherein said one or more layers is provided on one or both sides of the belt or sleeve, or in between two layers of strapping.

33. The method according to claim 31, further comprising the step of providing a texture to the functional coating.

34. The method according to claim 18, wherein said fibers, yarns, monofilaments or multifilament yarns are made of a material selected from the group consisting of aramids, thermoplastic polymers, thermosetting polymers, glass, carbon, and steel.

* * * * *